US010800316B2

(12) United States Patent
Teichrob et al.

(10) Patent No.: US 10,800,316 B2
(45) Date of Patent: Oct. 13, 2020

(54) SAND TRAILER

(71) Applicant: Continental Intermodal Group-Trucking LLC, Fort Worth, TX (US)

(72) Inventors: Gary Wayne Teichrob, Rosedale (CA); Patrick Scott Mason, Cultus Lake (CA); Alan Arthur Martens, Chilliwack (CA); Kevin Brent Thiessen, Rosedale (CA)

(73) Assignee: Continental Intermodal Group-Trucking LLC, Fort Worth, TX (US)

( * ) Notice: Subject to any disclaimer, the term of this patent is extended or adjusted under 35 U.S.C. 154(b) by 168 days.

(21) Appl. No.: 15/893,074

(22) Filed: Feb. 9, 2018

(65) Prior Publication Data
US 2019/0084468 A1 Mar. 21, 2019

Related U.S. Application Data

(60) Provisional application No. 62/561,312, filed on Sep. 21, 2017.

(51) Int. Cl.
*B60P 3/22* (2006.01)
*B62D 63/06* (2006.01)
(Continued)

(52) U.S. Cl.
CPC ............... *B60P 3/2205* (2013.01); *B60P 1/56* (2013.01); *B60P 3/2245* (2013.01);
(Continued)

(58) Field of Classification Search
None
See application file for complete search history.

(56) References Cited

U.S. PATENT DOCUMENTS 3,058,753 A * 10/1962 Carlsen .................. B60P 3/224
280/837
3,977,691 A * 8/1976 Robertson ................ B60P 3/40
280/81.1
(Continued)

OTHER PUBLICATIONS

Intermodal Road-Rail-Sea Load Distribution Diagram of Forty-Foot Container (Year: 2012).*
(Continued)

*Primary Examiner* — Jacob D Knutson
*Assistant Examiner* — Harold Eric Pahlck, III
(74) *Attorney, Agent, or Firm* — Lathrop GPM, LLP

(57) ABSTRACT

A trailer for transporting granular material, such as sand or proppant, has a purpose-built shape, and loading and unloading hatches at top and bottom. The trailer includes a hollow vessel for holding granular material. The vessel is enclosed with top and bottom hatches. The vessel has a tapered lower section and a domed upper section, allowing bulk material to be piled and concentrated horizontally below and above the hatches. A chassis extends fore and aft of the vessel, and potentially through an interior of the vessel. The chassis may extend upward from a wheeled section so as to pass through a vertically central part of the vessel. The chassis may also act as a trailer suspension system. The vessel may be made of aluminium and mounted to the steel chassis.

24 Claims, 16 Drawing Sheets

(51) Int. Cl.
*B60P 1/56* (2006.01)
*B62D 53/06* (2006.01)
*B62D 53/00* (2006.01)

(52) U.S. Cl.
CPC ............ *B60P 3/2255* (2013.01); *B62D 53/06* (2013.01); *B62D 63/06* (2013.01); *B62D 53/005* (2013.01)

(56) References Cited

U.S. PATENT DOCUMENTS

| | | | |
|---|---|---|---|
| 6,056,168 A * | 5/2000 | Owen, Jr. | B60P 3/2205 137/355.16 |
| 8,925,640 B2 * | 1/2015 | McCoige | A62C 27/00 169/13 |
| 9,758,083 B1 * | 9/2017 | Beelman, III | B60P 3/2245 |
| 10,301,106 B2 * | 5/2019 | Schaffner | B65D 88/32 |
| 2004/0031793 A1 * | 2/2004 | Garcia | B60P 3/221 220/1.5 |
| 2015/0137501 A1 * | 5/2015 | Kibler | B60P 3/221 280/837 |
| 2018/0251291 A1 * | 9/2018 | Markham | B65D 88/548 |

OTHER PUBLICATIONS

Two photos of a frame-through-vessel design used for hauling big chunks of coal. (Applicant Admitted Prior Art).

\* cited by examiner

SAND TRAILER

CROSS-REFERENCE TO RELATED APPLICATION

The present application claims priority from U.S. Provisional Patent Application No. 62/561,312 filed on Sep. 21, 2017, incorporated herein by reference in its entirety.

FIELD OF THE INVENTION

The present invention pertains to the field of transportation and material handling, and in particular to a trailer for holding and transporting flow-able bulk material such as sand or proppant.

BACKGROUND

Flow-able granular material, such as sand or hydraulic fracturing proppant, is used in bulk quantity in a number of applications. For example, in hydraulic fracture drilling performed by oil and gas industries, fracturing fluid, along with a granular proppant material such as sand and/or ceramics, is pumped into a drill well to create and prop open fractures in rock. For such activities, it is desirable to have sufficient and often large amounts of granular material readily available.

Often, activities requiring large amounts of granular material are performed in a remote location, requiring granular material to be shipped in for example by road, rail or water. When shipment of such material is conducted on road, trailers are typically used. When a trailer is used, the trailer is typically towed behind a vehicle such as a road tractor.

For such shipment, a large amount of granular materials need to be transported from place to place. The materials first need to be conveyed to a shipping trailer. When a trailer carrying such materials arrives at the drill well/construction site, the materials in the trailer need to be conveyed to a designated on-site repository or receiving device, such as a conveyor, storage silo or blender.

Quick, effective and efficient conveyance of bulk material is desired in applications such as the hydraulic fracture drilling industry. However, current trailers are subject to various design improvements. For example, many designs of current trailers are not ideal to convey granular materials from a delivering trailer to a receiving on-site repository in terms of time and cost efficiency. Inflow of the bulk material to the trailer and outflow of the material from the trailer are often undesirably slow. Use of multiple loading or unloading hatches in sequence can also cause interruptions. Inflow and outflow rates are often varying and not as fast as are desired. Trailer loads should be enclosed to prevent escape and exposure to hazards such as silica dust. Moreover, a cost for manufacturing a trailer for transporting bulk material is high, thus creating a need for a more cost-effective trailer.

Therefore, there is a need for a sand trailer that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a trailer for transporting granular material, such as sand or proppant. The trailer has a purpose-built shape, and loading and unloading hatches at top and bottom. The trailer has a chassis which in some embodiments passes through an enclosed vessel (bulk material container) for holding the granular material. The chassis may pass through or connect to a substantially vertically centralized portion of the vessel, so that parts of the vessel extend over top and underneath the chassis, but the amount of vessel overhang is limited, at least in the fore and aft directions. The chassis may include a raised horizontal member that contacts the vessel at a higher location than in prior art trailers. The vessel may be manufactured separately and of a different material and subsequently mounted to the chassis.

In accordance with embodiments of the present invention, the trailer includes: a hollow enclosed vessel for holding granular material, the vessel having a single loading hatch located at or near a top of the vessel and a single unloading hatch located at or near a bottom the vessel; a chassis extending fore and aft of the vessel; and at least two wheels mounted to the chassis, for example to an aft portion of the chassis. The chassis may optionally extend through an interior of the vessel. The loading and unloading hatches may optionally be centred horizontally with respect to the vessel. Alternatively, multiple loading and/or unloading hatches may be provided.

In accordance with embodiments of the present invention, the trailer includes a hollow enclosed vessel for holding granular material, the vessel having a single loading hatch located at or near a top of the vessel and a single unloading hatch located at or near the bottom of the vessel, the vessel being sized and shaped to concentrate bulk material held therein within a limited horizontal area, and to cause uninterrupted flow of the bulk material into the loading hatch and output of the unloading hatch when opened; a chassis connected to and supporting the vessel; and at least two wheels mounted to an aft portion of the chassis. Alternatively, multiple loading and/or unloading hatches may be provided.

In accordance with embodiments of the present invention, the trailer includes a hollow enclosed vessel for holding granular material, the vessel having one or more loading hatches located at or near a top of the vessel and one or more unloading hatches located at or near the bottom of the vessel, the vessel being sized and shaped to facilitate rapid flow of the bulk material out of the unloading hatches when opened; a chassis connected to and supporting the vessel; and at least two wheels mounted to the chassis, for example to an aft portion of the chassis.

In accordance with an embodiment of the present invention, there is provided a trailer for transporting flow-able material (such as but not necessarily limited to a granular material for hydraulic fracturing operations) comprising: a chassis having and a horizontally extending portion; at least two wheels or wheel alternatives mounted to the chassis; and a hollow enclosed vessel for holding the flow-able material. The vessel is mounted to the horizontally extending portion. The vessel further has a loading hatch located at or near a top of the vessel and an unloading hatch located at or near a bottom of the vessel. In some embodiments, the loading hatch and the unloading hatch are aligned along a common vertical axis, and material can be loaded and unloaded via gravity.

In some embodiments, the horizontally extending portion contacts and supports the vessel at a substantially vertically centralized location of the vessel. The horizontally extending portion may extend through, and optionally also fore and aft of, the vessel. The horizontally extending portion may be formed of one or more resilient materials and configured to operate as a suspension system for the trailer. One or more plates may cover holes in the vessel walls through which the chassis extends.

In some embodiments, sidewalls of the vessel are spaced apart from the horizontally extending portion extending through the vessel, thereby defining a region for the material within the vessel and horizontally outward from the horizontally extending portion. In some embodiments, the horizontally extending portion comprises a first beam and a second beam extending through the vessel in a fore-to-aft direction, and wherein one or more gaps for the material are located.

In some embodiments, a lower portion of the vessel is tapered downward toward the unloading hatch and the lower portion has an interior surface sloped at an angle equal to or greater than an angle of repose of the flow-able material.

In some embodiments, an upper portion of the flow-able material is disposed in a cone shape within the vessel upon loading to a predetermined full level, and an upper portion of the vessel comprises sidewalls which are positioned to be proximate to, but spaced apart from, the cone shape upon said loading to the predetermined fill level. In some embodiments, upon loading the vessel to a predetermined full level, a lower portion of the flow-able material rests against a first portion of interior sidewalls of the vessel, and wherein a second portion of interior sidewalls of the vessel above the first portion are tapered toward the loading hatch.

In some embodiments, one or more distributing devices are located within the vessel beneath the loading hatch, the distributing devices configured to receive and redirect the flow-able material, flowing downward from the loading hatch during loading, the redirection causing horizontal distribution of the flow-able material within the vessel.

In some embodiments, one or more vents at or near a top of the vessel to ventilate air inside of the vessel. The vents may include one or more elongated air channels where the air channel extends out from inside of the vessel to outside of the vessel with an outer end of the air channel facing downward.

According to another embodiment of the present invention, there is provided a method for manufacturing a trailer for transporting flow-able material, the trailer comprising: a chassis having a horizontally extending portion; at least two wheels or wheel alternatives mounted to the chassis; and a hollow enclosed vessel for holding the flow-able material, the method comprising: separately constructing the chassis and the vessel; mounting the vessel to the chassis by causing the horizontally extending portion to pass through apertures formed in opposing front and rear walls of the vessel, the apertures located at or near a vertical center of the vessel; and affixing the vessel to the chassis at a desired location. The method may further include sealing said apertures around the chassis.

According to another embodiment of the present invention, there is provided a method for converting a trailer for transporting flow-able material from a first configuration to a second configuration, the trailer comprising: a chassis having a horizontally extending portion passing through the vessel, at least two wheels or wheel alternatives mounted to the chassis; and a hollow enclosed vessel for holding the flow-able material, the method comprising: unfixing the vessel from its current position mounted to the horizontally extending portion, said current position corresponding to the first configuration; relatively moving the vessel and the chassis so that the vessel is located in a second position on the horizontally extending portion, the second position corresponding to the second configuration; and affixing the vessel to the chassis at a second location.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
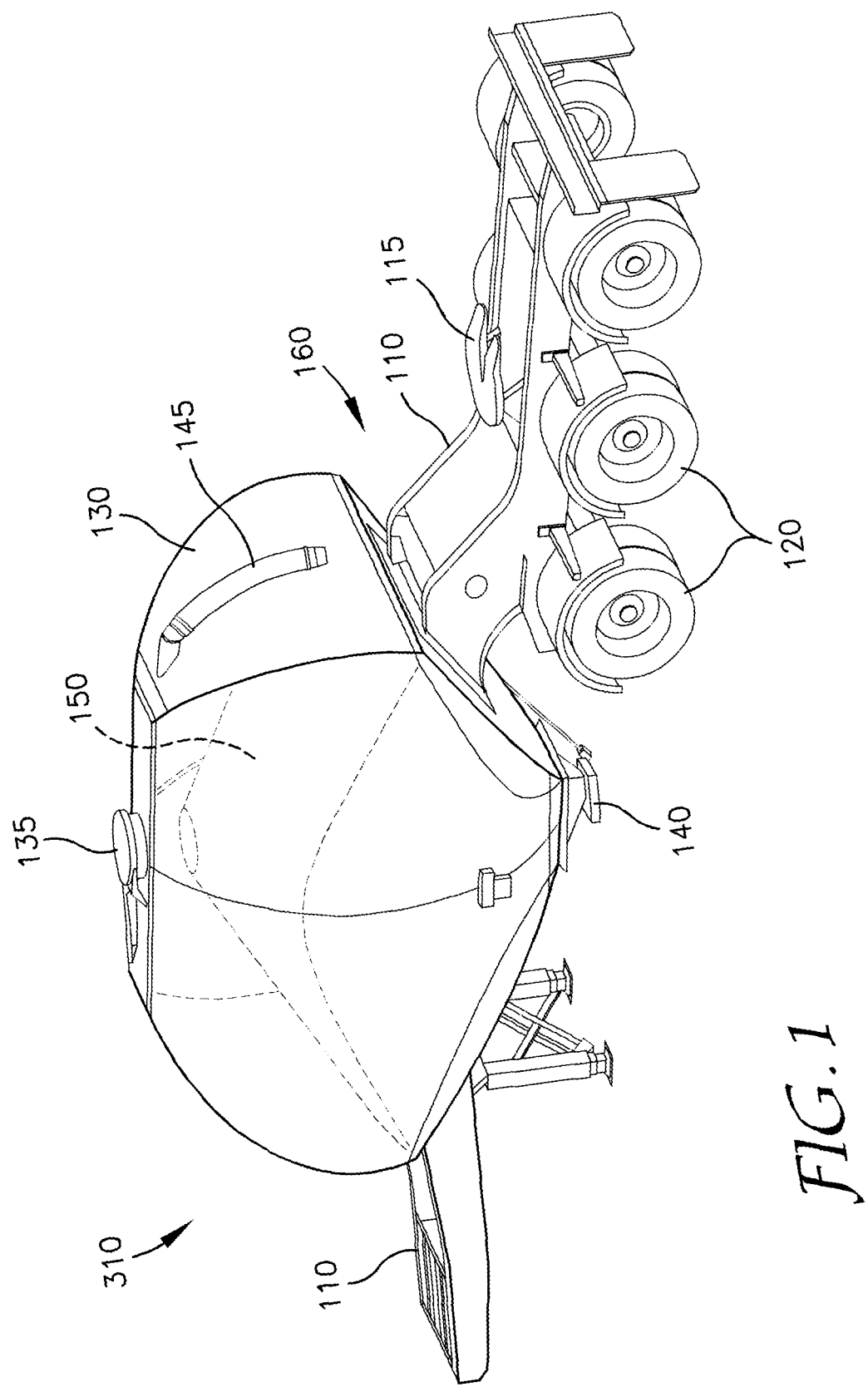
FIG. 1 illustrates a trailer configured as a lead trailer, in accordance with an embodiment of the present invention.

Embodiments of the present invention provide for a trailer for transporting flow-able, granular material, such as but not necessarily limited to proppant used for hydraulic fracturing. The trailer may be constructed for this particular purpose, and so is customized to that purpose (purpose-built).

Hatches at the bottom and top of the trailer are provided. In some embodiments of the present invention, a single loading hatch is located at or near a top of the vessel and a single unloading hatch is located at or near a bottom of the vessel. One or more additional loading hatches can be provided at or near a top of the vessel to import bulk materials more effectively into the vessel, or to provide alternatives for material import. Likewise, one or more additional unloading hatches can be provided at or near a bottom of the vessel for more effective or alternative export of bulk materials. The hatches can be opened manually or automatically. The hatches are sized to allow for rapid flow of material into or out of the trailer. The trailer includes a chassis which in some embodiments extends through the hollow container vessel. The chassis and the vessel may be manufactured of different materials. For example, the chassis may be steel while the vessel may be aluminum. This allows for advantages of both materials to be leveraged. For example, an aluminum vessel may reduce trailer weight, while a steel chassis may provide higher strength of the trailer portion supporting the vessel and subjected to road shocks. This, combined with the chassis-through-vessel design (described below) provides for a hybrid composite design for the chassis and vessel. This configuration may allow for improved structural properties and on-road and/or off-road performance, while potentially reducing construction cost. Standard measures for mitigating galvanic corrosion between the steel and aluminum parts may be taken.

In some embodiments, the chassis and the vessel may be connected via marrying plates, which are interposed between the chassis and the vessel. This avoids direct contact between the chassis and the vessel. The marrying plates may be attached to both the chassis and the vessel, or bolts attaching the chassis to the vessel may pass through holes in the marrying plates. Galvanic corrosion can thereby be limited to the marrying plates, and corroded marrying plates can be replaceable. Additionally or alternatively, galvanic corrosion can be mitigated by painting contacting surfaces of different materials, such as the chassis and marrying plates. Sealant placed between these surfaces can also mitigate corrosion. In some embodiments, the marrying plates may also operate as sealing plates.

Various manual or automatic mechanisms can be used to open and close the loading and unloading hatches, and different mechanisms can be used for different hatches. For example, a pneumatic, hydraulic or electrically driven mechanism can be provided. The mechanism can include one or more mechanical components to transmit and translate mechanical power from a power source into closing and opening motion for the hatches. The power source can be a manually actuated crank, lever, or other device, an integrated or external pneumatic, hydraulic or electric motor, or the like. The mechanical components may be operative with or communicatively connected to a remote control panel so that opening and closing motion of the hatches can be controlled without accessing to the hatch at a remote distance. In some embodiments, the hatches can be operated automatically, for example in response to detected proximity to a source or destination for the bulk material. Proximity detection may be carried out using machine vision, radio beacons and detectors, or other sensors. In some embodiments, the hatches can be operated automatically in response to a signal provided by a control station or another piece of equipment configured to automatically interoperate with the vessel hatches.

In some embodiments, the top hatch may be a hinged lid or other port closure system with manual or automatic (e.g. remote) actuator. A pressure lock lid, such as the PL008-C offered by Bellseng Technology Inc. is an example of a potentially suitable top hatch. In some embodiments, the bottom hatch may be a butterfly valve, such as made by Bulk Tank Inc. (BTI). A butterfly valve neck extension such as the EasyAccess™ extension from BTI and a control handle such as the HD™ valve handle from BTI may also be used to facilitate manual valve control. Other comparable systems can also be used. The valve may correspond to the largest valve readily available, for example.

In some embodiments, the chassis includes a main horizontally extending section which is constructed to provide sufficient strength for supporting a fully loaded vessel. I-beams or similarly reinforced elongated bodies can be used to provide the required strength and rigidity. For example, the chassis may be constructed using two elongated parallel structures (similar to beams but with a varying width profile) each comprising vertically extending metal webs terminating in top and bottom flanges. The two parallel structures can be coupled together using one or more horizontally extending connectors. Holes or gaps may be formed in select portions of the chassis to reduce the amount of material thereof. The horizontally extending section may be narrower in width (as well as height) than the vessel. Thus, the vessel extends horizontally outward (i.e. sideways to the trailer direction of travel) from the horizontally extending section. The vessel may also extend upward and downward from the horizontally extending section.

Furthermore, the part of the vessel which extends horizontally outward from the horizontally extending section of the chassis may include a part of the vessel that is at the same vertical height as this horizontally extending section. Thus, a portion of the bulk material can be carried at the same height as the horizontally extending section but laterally outward therefrom. When the chassis extends through the vessel, the bulk material can surround the portion of the chassis that extends through the vessel. As such, sidewalls of the vessel are spaced apart from the horizontally extending portion extending through the vessel. This thereby defines a region for the material within the vessel and horizontally outward from the horizontally extending portion.

The horizontally extending section of the chassis may extend upward from a first chassis section (comprising the trailer wheels) and then horizontally forward toward the vessel. The horizontally extending section may thus be curved in shape. The upward extension causes the chassis to contact the vessel at a higher elevation than in conventional trailers. The vessel may be connected to the chassis at the top part of the upward extension. The point of contact may be a substantially vertically centralized portion of the vessel. When the vessel is shaped so that a bottom portion is tapered toward ground, the point of contact may be at or near the top of the taper, i.e. near a part of the vessel with widest horizontal area. Because of this, the amount of fore and aft overhang of the vessel above the point of contact is limited. Also due to this elevated point of contact, the chassis may connect horizontally to the vessel at a location which is vertically at or near the center of mass of the vessel, for example when fully loaded. This assists in balancing the load such that the load existing within the vessel and below the horizontally extending section is more equal to the load existing within the vessel and above the horizontally extending section. Viewed another way, torque exerted onto the chassis due to the furthest part of the vessel is mitigated due to the distance between the chassis contact point and the furthest part of the vessel away from the contact point being limited and possibly minimized.

In various embodiments of the present invention, the attachment and sealing between the chassis and vessel has a particular configuration. The chassis may pass through openings in the vessel, the openings being subsequently closed off and sealed. This is referred to as a chassis-through-vessel design. The chassis acts as a continuous elongated support beam onto which the vessel is mounted, a portion of the chassis being enclosed by the vessel. The chassis thus extends forward, rearward, and through the vessel. For balance, an upper part of the vessel extends above the chassis while a lower part extends below the chassis.

In other embodiments, an alternative to the chassis-through-vessel design may be used. For example, the chassis may extend around the outside of the vessel, or two separate pieces of chassis may be attached to the fore and aft of the vessel. That is, a first part of the chassis may connect to a front part of the vessel and extend forward of the vessel, and a second, separate part of the chassis may connect to a rearward part of the vessel and extends rearward of the vessel. Similarly to the above, an upper part of the vessel extends above a main axis of chassis while a lower part extends below the main axis of the chassis. The main axis can generally correspond to the linear region between the location of chassis attachment at the front of the vessel and the location of chassis attachment at the rear of the vessel. The inwardly and downwardly sloping (i.e. tapered toward the ground) lower portions of the vessel can be used for the locations of attachment to the two separate pieces of the chassis. This provides a sloped bearing surface for the attachment which provides more support than in the alternative of forming the attachments along a vertical surface. The attachment between the vessel and chassis may be permanent or temporary. For temporary attachment, the chassis pieces can be disconnected from the vessel, and, for example, a new (possibly differently sized and/or shaped) vessel may be attached to the chassis pieces. In some embodiments, the chassis, or a portion thereof, may extend into the vessel via an aperture formed in one sidewall of the vessel, and the chassis or portion thereof may terminate at a location interior to the vessel.

In various embodiments, an upper part of the vessel extends above the chassis while a lower part of the vessel extends below the chassis. In other words, the chassis passes through or connects to a centralized portion (vertically speaking) of the vessel. This may provide for improved balance. In addition, the centralized connection may provide for clearance of the trailer (i.e. high enough to allow for clearance of the trailer) and for improved access to the unloading hatch and/or underside of the trailer. This configuration is in contrast to a chassis which forms a bed (flat or otherwise) upon and above which the entirety of the vessel is mounted, possibly with a hole cut through the chassis bottom for the bottom hatch. Another consequence of this configuration is that, because the vessel has a bottom portion that is tapered toward ground (similarly to a hopper), and because the chassis is connected to the vessel at a location at or near the top of this bottom portion, there is less (or possibly zero) fore and aft overhang of the vessel overtop of the chassis. This is relative to the alternative design where the bottom of the vessel rests on the chassis. The overhang is shown as region 160 in FIG. 1, and corresponds to the portion of the vessel 130 that extends outward from the location of contact of the vessel and chassis.

It is also noted that, rather than the entirety of the vessel sidewalls being tapered toward ground (to form the hopper portion of the vessel), the upper portion of the vessel is tapered away from ground. That is, in the upper portion, the sidewalls curve toward a top peak where the loading hatch is located. The upper portion may be domed. As a consequence, the horizontally widest part of the vessel (in fore-to-aft direction) is located at or a limited distance above the top of the location of contact of the vessel and chassis. In other words, and in some embodiments, the chassis and the vessel meet at or near a location where the area of contact of the two components can be substantially maximized. This bulbous shape of the vessel also serves to limit the overhang.

In one embodiment, the height of the upper portion is approximately equal to the height of the lower portion. This can allow for the material loading and unloading rates to be substantially balanced with each other. In another embodiment, the height of the upper portion is no less than half the height of the lower portion. In yet another embodiment, the height of the upper portion is no more than twice the height of the lower portion.

Due to the above, the vessel is, in various embodiments, configured so that it is significantly shorter, in the trailer fore-to-aft direction, than the chassis, and so that the amount of vessel fore and aft overhang is limited. Furthermore, the vessel is, in various embodiments, supported at only the two main points of contact with the chassis. Therefore, auxiliary support posts (which would otherwise extend from the outer edges of the vessel downward to the chassis) may be omitted.

In various embodiments, the trailer is designed, in various such embodiments, to allow sand to be loaded and/or unloaded substantially completely using gravity, without air pressure or vibration. This may be in contrast to a pneumatic trailer, for example, which uses forced air to facilitate the loading and/or unloading process.

Some embodiments of the present invention provide for a substantially flexible chassis. This is in contrast to typical vessel trailers which are normally rigid. For example, one or more elongated pieces of the chassis, such as the horizontally extending section connected to or passing through the vessel have a certain degree of flexibility in themselves. In case that the chassis-through-vessel design is used, the long, continuous steel chassis (e.g. comprising two parallel and possibly curved beam-like structures) can allow for a certain degree of flexibility of the trailer. This flexibility may potentially allow the chassis itself to act as a part of the suspension system, such as a spring (e.g. a leaf spring), by flexing and absorbing impacts and other forces on the trailer. The chassis thus operates as part or all of a suspension system for the trailer. To facilitate this, at least some part of the chassis may be manufactured of one or more resilient materials, such as steel, which exhibit a limited amount of flexibility but a tendency to return to its original shape. These chassis components can be constructed to provide for a predetermined amount of resilience and flexibility commensurate with the desired operation as a suspension system. The resilience of the chassis, as a suspension system, may provide for desired on-road and off-road performing capabilities of the trailer. The resilience and flexibility of the chassis may also add to the longevity of the trailer. Often, many other trailers tend to crack quickly due to their stiffness. Embodiments of the present invention may also use X-shaped cross-members between the chassis rails to further promote flexibility.

As noted above, the chassis may act as a leaf spring member in a suspension system of the trailer. The chassis can deflect in the middle and thereby act as a component of the suspension. This deflection can occur primarily when the trailer is loaded and primarily in the middle portion of the chassis. Due to placement of the vessel, the deflection can occur partially or fully within the portion of the chassis which extends through the vessel.

It is recognized herein that the flow-able material (e.g. sand or proppant) has mechanical dampening properties. In some embodiments, therefore, the flow-able material is made to surround and contact the portion of the chassis that is located within the vessel according to the chassis-throughvessel design. This causes the chassis and flow-able material to operate together as a damped spring suspension component when the trailer is loaded, in which chassis deflection is dampened by the flow-able material. As will be readily understood, a damped spring is a desirable mechanical component for a suspension system, and in this case dampening can be achieved at least partially using the cargo flow-able material.

As such, the flow-able material (e.g. sand) within the container contacts the horizontally extending portion of the chassis within the vessel and dampens oscillations in the chassis. The horizontally extending portion within the vessel can include two spaced-apart rails without cross members, for example. The chassis acts as a spring (e.g. a leaf spring) to absorb road shock and vibration during trailer movement. The flow-able material contacts and surrounds chassis. The flow-able material acts as a dampener to the chassis operating as a spring. The region of contact between the sand and the chassis is localized to a particular part of the chassis due to fore-to-aft sizing of the vessel.

In some embodiments, the chassis comprises plural sections connected together in a longitudinal direction of the trailer. For example, two, three, or more sections can be bolted together. In one embodiment, a first section of the chassis is disposed partially or fully within the vessel. A second section can extend forward of the vessel, a third section can extend rearward of the vessel, or both. The location of connection between the sections can coincide with the boundaries of the vessel. In one embodiment, the sealing plates or marrying plates can be interposed between chassis sections at this location of connection. Use of plural sections can simplify construction.

Potential advantages of the chassis-through-vessel design include one or more of the following. Manufacturing of the trailer can be simplified by assembling the chassis and the frames separately, and then attaching the frame to the chassis. Replacement and repair of the vessel can be simplified, because of its separation from the load bearing chassis. The strength to weight ratio of the vessel can be optimized, because it does not contribute to the structural integrity of the trailer. Different materials, such as steel and aluminum, can be used together easily for the vessel and chassis, respectively. The chassis can be made to be flexible without placing undue stress upon and potentially cracking the vessel. The vessel can be replaced with a different size or shape of vessel during trailer repurposing, by removing the existing vessel and mounting a new vessel onto the chassis.

In some embodiments, a fore (front part) and/or aft (rear part) of the chassis is adjustable/extendable in length.

In some embodiments, a trailer having the chassis-through-vessel design can be configured so that the vessel is movably mounted to the horizontally extending portion of the chassis. The vessel may be slideably or roll-ably mounted to the chassis, for example. The vessel is robustly fixed in a particular position for transportation, for example using bolts or another locking or affixing mechanism. In some embodiments, moving of the vessel position on the chassis can be performed in the field. In some embodiments, moving of the vessel position on the chassis may require significant mechanical work, such as unbolting the vessel from the chassis, and lifting and holding the vessel in place using heavy lifting equipment while it is repositioned. Moving the vessel in the fore-to-aft direction can allow a trailer to be fore-to-aft balanced for a particular configuration. Moving the vessel in the fore-to-aft direction can allow a trailer to be reconfigured between a lead trailer configuration (e.g. as in FIG. 1) and a pup trailer configuration (e.g. as in FIG. 2A). As such, the same base trailer design can be used for both lead and pup trailer configurations, thereby increasing application flexibility.

In various embodiments, the vessel size, capacity and fore-to-aft balance can be designed to work in a particular truck and trailer configuration to maximize load carried within specified legal per-axle weight limits. The vessel size, shape and position can all be configured to this end.

According to some embodiments of the present invention, there is provided a method for manufacturing a trailer as described herein, the trailer having a chassis-through-vessel design. The method includes constructing the chassis and the vessel separately. For example, the chassis can be instructed to include the wheelbase, and the horizontally extending portion. The chassis can be formed of elongated steel support members, for example. The vessel, for example having the shape as described elsewhere herein, can be constructed by forming and welding sheets of material, such as aluminum, together, possibly along with additional structural elements. A welding jig/fixture can be used to support pieces of the vessel during construction. The vessel is constructed with apertures in opposing front and rear walls, creating a channel large enough for the horizontally extending portion of the chassis to pass through. These apertures can be formed at or just below the vertically middle part of the vessel, for example just below the widest part of the vessel in the case of the vessel having a bottom portion tapered downward and a top portion tapered upward.

The method further includes mounting the vessel onto the chassis. This may be accomplished by holding the vessel steady at an appropriate height moving the horizontally extending portion of the chassis into and through the channel formed within the vessel (related to the apertures in the front and rear walls). This may alternatively be accomplished by holding the chassis steady and sliding the vessel onto the chassis so that the horizontally extending portion passes into and through the channel formed within the vessel. The method may further include sealing the apertures, in the opposing front and rear walls of the vessel, around the chassis. For example, plates or other sealing means may be affixed to the vessel which cover some or substantially all gaps around the chassis where it enters and exits the vessel. The plates or other sealing means are configured to inhibit escape of bulk material from the vessel, through gaps in the vessel front and rear walls and around the chassis. The plates can be slid on to the horizontally extending portion in a similar manner to the vessel.

According to some embodiments of the present invention, there is provided a method for converting a trailer between two configurations, such as lead and pup configurations, or two configurations with different fore-to-aft load-balance characteristics. The trailer is of the chassis-through-vessel design, as described above. The method includes unfixing the vessel from the chassis, for example by removing bolts and/or spot welds. The method may further include unfixing and removing plates or other sealing means that are located around the chassis where it enters and exits the vessel. The method further includes repositioning the vessel on the chassis (e.g. on the horizontally extending portion of the chassis). For example, the vessel can be slid, carried or rolled forward or backward while the chassis is held in place, or the vessel can be held in place and the chassis can be rolled forward or backward. The method further includes fixing the vessel to the chassis at the new position, for example using bolts and/or spot welds. The method may further include installing plates or other sealing means (possibly the previously removed plates or sealing means) to cover gaps in the vessel apertures around the chassis.

According to some embodiments having the chassis-through-vessel design, a conduit is attached to the portion of the chassis passing through the vessel. The conduit has openings at the fore and aft of the vessel, allowing lines such as electrical and hydraulic or pneumatic lines to be run through the vessel within the conduit.

According to some embodiments of the present invention, there is provided a method for repairing a trailer, the method including removing a damaged vessel from the chassis and re-attaching the vessel after repair or attaching another vessel, such as a new or undamaged vessel, to the chassis. The vessel can be removable from the chassis by removing fastening means or welds between the vessel and the chassis, which are originally constructed as separate pieces.

In various embodiments, the trailer vessel has a hopper or pyramid-shaped bottom portion, and a curved or dome-shaped top portion. The hopper-shaped bottom portion facilitates material flow, while the curved side panels of the dome-like top portion may provide structural integrity. Therefore, at least the lower side walls of the vessel may be tapered toward the bottom hatch (and ground) to facilitate flow of bulk material during unloading. Some examples of such shapes are poly-pyramid, cone, paraboloid, horn, and poly pyramidal horn. Any derived form of said geometries or hybrid of one or more said geometries can be also used for the design of the lower and/or upper portion of the trailer vessel. In some embodiments, the hopper-shaped bottom portion is removably attached to the trailer, to facilitate maintenance. The vessel is localized on the trailer, so that it covers a limited horizontal area. This facilitates vertical buildup of granular material in the vessel and limits horizontal spreading of the material. In other words, the vessel acts to concentrate the granular material within a limited horizontal area, in order to stack the material vertically as much as is practical. The bulk material is therefore piled and concentrated horizontally below and above the loading and unloading hatches, respectively. The loading and unloading hatches are aligned along a common vertical axis. This facilitates the loading and unloading by localizing the stored bulk material substantially underneath and overtop of the loading and unloading hatches, respectively, with limited horizontal spreading.

Embodiments of the present invention are configured for holding and transporting bulk material having a limited range of properties, such as density, grain size, and angle of repose, or a combination thereof. An example material is proppant, such as sand, used in hydraulic fracturing operations. The vessel may be substantially optimized in its size or shape in order to accommodate such material and the rapid loading and unloading thereof. The vessel shape may be configured to have sufficient volume for carrying up to a maximum allowable weight of the bulk material. The vessel may therefore be purpose built for rapidly loading and unloading a particular type of bulk material while carrying sufficient amount of the bulk material, such as close to a maximum load allowed by regulations.

In various embodiments, the vessel shape is configured to closely match to the shape of the intended contained material (e.g. frac sand) when naturally piled. This reduces the amount of empty space in a vessel when loaded to maximum allowable weight, and consequently reduces the amount of vessel sidewall required. This shape also inhibits the load from shifting during transport, which could otherwise result in a load imbalance. In some embodiments, the bottom portion of the vessel matches with or exceeds the natural angle of repose of the intended contained material. That is, the bottom interior surface of the vessel is sufficiently sloped that when the unloading hatch is opened, the intended type of contained material will slide downward rather than resting on the surface. This facilitates full unloading of the vessel using gravity without pneumatic power. As a result, the amount of dust generated at the time of unloading will be significantly reduced.

In various embodiments, the vessel shape is configured so that the flow-able material (e.g. sand or proppant) flows downward out of the vessel unloading hatch according to a funnel flow mode, rather than a mass flow mode. This inhibits rubbing of the flow-able material (which may be abrasive) on the vessel walls, thereby mitigating wear. As will be readily understood, during funnel flow, flow-able material near the vessel periphery does not move downward immediately during discharge, but rather falls inward as material more central to the vessel is discharged. Funnel flow can also result in a shallower slope of the hopper bottom, which can allow for a reduced vessel overall height.

In some embodiments, some or all of the upward facing surfaces within the vessel interior are sloped to inhibit retention of material thereon when the unloading hatch is open. For example, upper facing portions of the chassis extending through the vessel may be sloped.

In some embodiments, one or more interior corners of the vessel are filleted or chamfered. The fillets or chamfers may be provided as additional metallic material disposed in these corners. The additional material may add structural strength of the vessel, while also inhibiting bulk material from collecting in vessel corners where it could potentially remain during unloading. This configuration allows for the desired sloping of surfaces in the vessel to match or exceed the material to also be achieved in the corners of the vessel, while also adding structural strength to the vessel.

In some embodiments, as illustrated in FIG. 1, although the vessel may have walls that are curved in at least the vertical direction, the walls may be less curved or uncurved in the horizontal direction. Thus, the vessel may include four curved corner regions at which adjacent vessel walls meet at about 90 degrees in the horizontal plane. In other embodiments, these corner regions may be rounded, for example by providing a vessel that comprises circular or elliptical cross sections.

The loading and/or unloading process can comprise single point loading or unloading. According to single point loading, the loading hatch can be placed directly underneath the output of a drive-under silo or other loading solution. The trailer can then be fully loaded with granular material from a single, stationary source, and without requiring repositioning of the trailer. Similarly, for single point unloading, the unloading hatch can be placed directly overtop of a conveyor or other unloading point, and substantially all of the granular material can be unloaded out of the unloading hatch without requiring repositioning of the trailer.

As such, the loading hatch is a single unique loading hatch on the vessel, the unloading hatch is a single unique unloading hatch on the vessel, or both. Furthermore, the vessel is shaped to facilitate trailer balance during and after loading and unloading. This may be achieved by centralizing the hatches on a vessel that is substantially symmetric both in the fore-to-aft and left-to-right directions, with the hatches placed on the planes of symmetry. By using single loading and unloading hatches, trailer balancing is simplified relative to the case of multiple hatches, where multiple load and unload points must be operated carefully to maintain trailer balance.

Furthermore, the vessel may have a limited horizontal width and length, which are configured to concentrate the bulk material into a volume having correspondingly limited horizontal area. On the one hand, the vessel should have sufficiently large horizontal dimensions that an adequate volume of bulk material can be carried, given restrictions on the vessel height, and also to facilitate rapid loading by allowing the material to spread out upon entry into the vessel. On the other hand, the vessel should have sufficiently small horizontal dimensions that the bulk material is inhibited as much is possible from spreading horizontally, to facilitate rapid unloading.

The angle of repose of material can be used for determining how the bulk material will distribute when received from the top loading hatch. Based on this information, the vessel can be sized and shaped so that, during loading, the bulk material flows away from the loading hatch so that the filling can continue uninterrupted. That is, the vessel may be configured to have sufficiently large horizontal dimensions that the bulk material can be poured into the top loading hatch substantially continuously at a given rate.

In some embodiments, the vessel is sized and shaped so that a substantially maximum mass of bulk material can be held and distributed from a limited volume of space.

In various embodiments, the vessel is sized and shaped so that the bulk material flow rates during loading and/or unloading are as high as can be practically achieved. This can be accomplished in part by concentrating the late bulk material in a limited horizontal area, and configuring the size and shape of the vessel so that bulk material moves both downward and outward upon entry into the vessel and/or so that interruptions to the flow of bulk material are limited or inhibited entirely. This can facilitate a rapid turnaround time, corresponding to loading and unloading of the trailer at endpoints of a material supply route.

Maximizing flow rate and/or limiting flow interruptions during loading can be accomplished in part by configuring the vessel to have adequately large horizontal dimensions such that the bulk material will flow downward and outward away from the loading hatch at as high a rate as is practical. A convex dome-shaped upper portion of the vessel can be part of such a configuration. Maximizing flow rate and/or limiting flow interruptions during unloading can be accomplished in part by configuring the lower portion of the vessel in a hopper shape with adequately steeply sloped sidewalls, which in turn calls for a limited maximum horizontal area of the vessel. The overall vessel size and shape can be configured in order to balance the above competing objections for a given maximum volume of bulk material.

Optionally, the inner surface of the vessel may be coated with anti-adhesive materials in order to prevent bulk material from staying at the sloped sidewall of the vessel. The coated anti-adhesive material will limit the friction between the inner surface of the vessel and the bulk material so that unloading of the bulk material (e.g. downward movement of bulk materials) will be less disturbed. In consequence, not only rapid but also complete unloading of the bulk material can be accomplished.

In some embodiments, unloading of bulk material can be performed at a rate of about 20,000 pounds per minute, for example due to the aperture size of the butterfly valve of the unloading hatch when fully opened. The unloading performance may be further enhanced by installing butterfly values with a larger size of aperture.

Embodiments of the present invention provide a vessel with a single unique loading point. The loading point coincides with the loading hatch 135 located at the top of the vessel and substantially in the horizontal centre of the vessel.

Embodiments of the present invention provide a vessel with a single unique unloading point. The unloading point coincides with the unloading hatch 140 located at the top of the vessel and substantially in the horizontal centre of the vessel.

Embodiments of the present invention comprise a substantially enclosed vessel with close-able loading and unloading hatches. This inhibits the escape of bulk material. This leads to greater retention of bulk material and prevents silica dust from escaping into the surrounding area, which can pose a health hazard. The limited area of the loading and unloading hatches also facilitates dust mitigation. The position and configuration of the vent allows air to flow in and out of the vessel while inhibiting dust exiting out of the vent. Furthermore, gravity based loading and unloading avoids the potential for excessive dust associated with pneumatic trailers.

FIG. 1 illustrates a trailer 310 configured as a lead trailer, in accordance with an embodiment of the present invention. The trailer includes a chassis 110 and a vessel 130 mounted to the chassis. The chassis 110 extends fore and aft of the vessel 130. The chassis 110 may, in some but not necessarily all embodiments, extend through the interior of the vessel 130. Wheels 120 are mounted to the rear portion of the chassis. One or more additional wheels (not shown) may be optionally mounted to the fore portion of the chassis for effective control of the trailer movement. A trailer hitch 115 is mounted to the rear portion of the chassis for connection to a pup trailer, to be towed behind the lead trailer. Another trailer hitch (not visible) is mounted to the front portion of the chassis, for connection to a road tractor or other equipment. The trailer hitch 115 may be a king pin receiver or similar system for pivotable connection to another trailer, a road tractor or other equipment.

As illustrated, the chassis 110 connects to the vessel 130 at a substantially vertically central location. The vessel 130 generally comprises a top, domed half and a bottom, tapered half. The chassis may therefore be tapered toward both top and bottom, with respect to its front, back and side walls. The chassis connects to the vessel at a location near the top of the bottom, tapered half. The domed top half provides a cover for the granular material while limiting unused space (and limiting the area of the vessel sidewall) within the vessel when the granular material is piled naturally into a conical shape. This shape also allows the granular material to form uninhibited into its natural conical shape during loading.

The domed shape and the limited fore and aft overhang of the vessel may be related. In more detail, a shape of the bulk material within the vessel, at a nominal maximum load (corresponding to loading to a predetermined full level), is determined. This shape includes a lower portion which contacts the vessel and conforms to the shape of the vessel. The shape also includes an upper portion that is disposed in a natural shape, such as a cone shape, due to pouring of the material into the vessel through the loading hatch. The uppermost point of contact between the bulk material and the vessel defines a curve along the interior of the vessel. In various embodiments, the upper part of the vessel is dome shaped such that, at least above this curve defined by the uppermost point of contact between the bulk material and the vessel, the vessel is tapered away from ground, and toward the top loading hatch. For example the vessel is angled (e.g. along an arcuate curve) toward the loading hatch in this region. In particular, the front and rear walls of the trailer may be curved in this manner. Furthermore, the upper part of the vessel is configured so that it is spaced apart from the upper portion of the bulk material, so as not to interfere with the loading of the bulk material.

As such, an upper portion of the vessel comprises sidewalls which are positioned to be proximate to, but spaced apart from, the cone shape upon said loading to the predetermined fill level. A lower portion of the bulk, flow-able material rests against a first portion of interior sidewalls of the vessel. This first portion includes the lower portion that is tapered toward the unloading hatch and ground. A second portion of interior sidewalls of the vessel, above the first portion, is tapered toward the loading hatch and away from ground, for example in a dome shape or similar shape.

In more detail, and in some but not necessarily all embodiments, the vessel includes two opposing sidewalls that are convexly curved. Each of the sidewalls can be formed of one, two, or more unitary pieces which extend from an upper end that is substantially level with the top hatch to a lower end that is substantially level with the bottom hatch. A horizontal, rectangular top portion includes the top hatch. The front wall of the vessel includes a substantially flat lower portion through which the chassis extends, and a convexly curved upper portion which is attached to the lower portion along a horizontal seam. The lower portion extends from a lower end that is substantially level with the bottom hatch to a location just above the chassis. The lower end is angled inwardly as part of the bottom tapered half. The upper portion extends to an upper end that is substantially level with the top hatch. The rear wall of the vessel is configured similarly to the front wall.

In various embodiments, the vessel has a limited number of seams, in order to limit welding requirements during construction and improve overall aesthetics. This can be achieved at least in part by using curved wall portions in vessel construction.

In some embodiments, opposing pairs of sidewalls, or opposing front and rear walls, of the vessel, or a combination thereof, are tied together. For example, one or more elongated connectors (cross members) such as cables or rods can be mounted inside the vessel and affixed to opposing interior wall surfaces thereof via hooks or fasteners. Tensile strength in the connectors can facilitate the required structural integrity of the vessel. As such, the trailer may include a cross member disposed within the vessel and attached to opposing sidewalls or end walls of the vessel.

In some embodiments, cross members within the vessel are omitted, thus reducing weight, allowing for increased vessel capacity and reduced impedance to material flow within the vessel. Flow-able material held within the vessel can reinforce the vessel against compression, thereby operating as a type of reinforcing portion of the vessel.

The vessel 130 includes a top loading hatch 135 and a bottom unloading hatch 140, so that granular material 150 can be loaded and unloaded with the assistance of gravity but in various embodiments without assistance of air pressure or vibration. This may significantly reduce the amount of dust that may be generated when loading or unloading granular materials. The vessel is illustrated in a partially transparent manner so that the granular material 150 can be seen. The granular material is shown in a peaked shape which is formed naturally during the loading process. Agitation of the vessel may cause the material to settle within the vessel. The vessel may be of sufficient height and volume that the maximum allowable amount of granular material can be loaded therein without requiring agitation.

The vessel further includes a vent 145 which provides an air channel between the inside and outside of the vessel. The vent connects with the vessel at or near a top of the vessel. The vent comprises of one or more elongated air channels that extend out from inside of the vessel to outside of the vessel. The outer-end of the air channels may face downward. In some embodiments, the vent, as illustrated in FIG. 1, has a first end which extends horizontally out from the vessel and a second end which is below the first end and faces downward. The illustrated vent also includes an elongated air channel having a first end fluidically connected to the interior of the vessel near the top of the vessel and having a second end fluidically connected to the exterior of the vessel at a location below the first end. Due to the vent and closable hatches, the vessel 130 is enclosed yet vented. The vent can be configured, for example due to its location at the top of the vessel and/or the inclusion of a screen, to inhibit the outward flow of bulk material through the vent. To further prevent outward flow of bulk material, the vent may comprise an air filter to reduce, for example, the amount of silica dust escaping outside the vessel. The vent operates to equalize the pressure within the vessel to facilitate rapid loading and/or unloading of the vessel.

Various features which are labelled in FIG. 1 are also visible, but not necessarily labelled, in FIGS. 2 to 8.

Figure 2A:
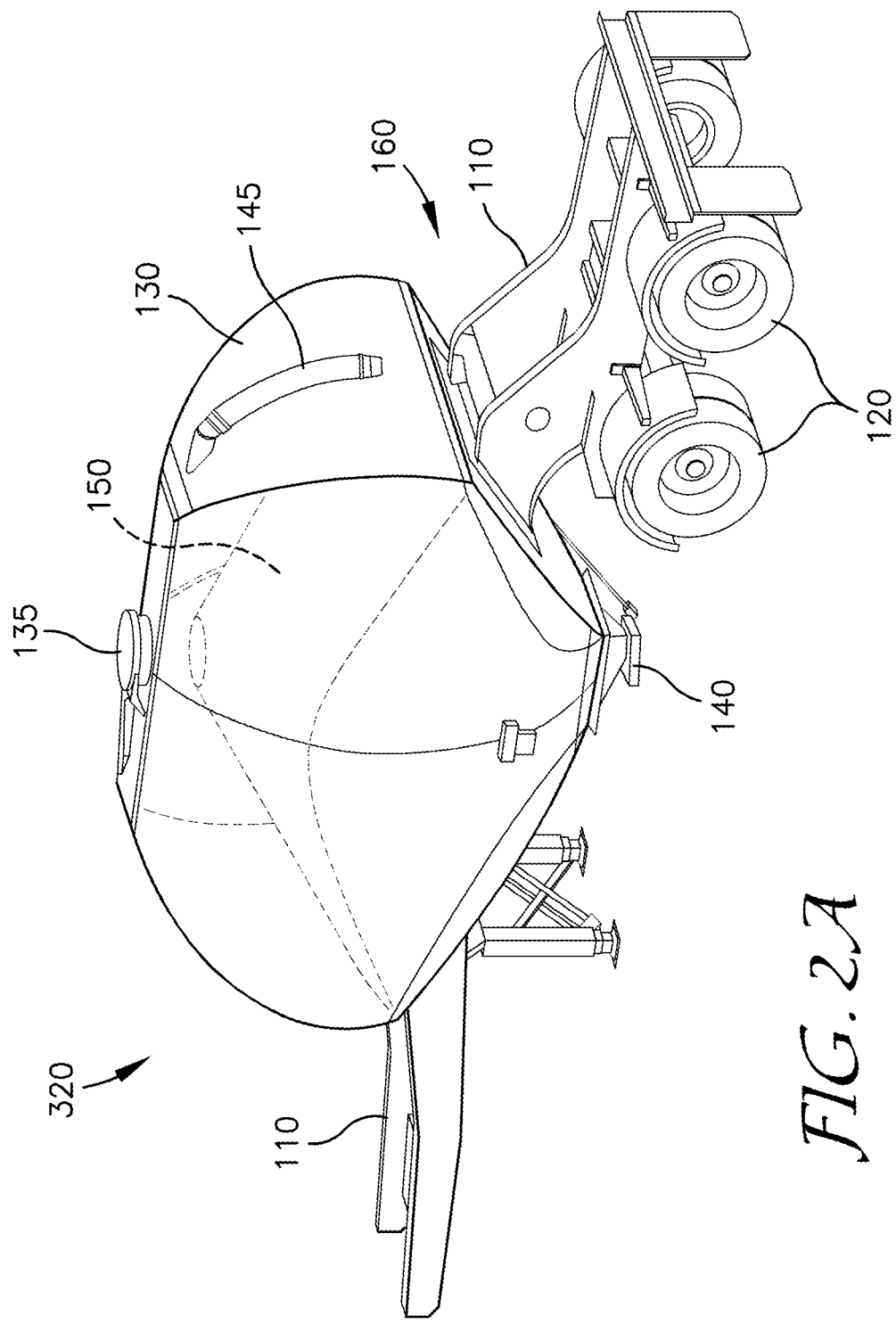
FIG. 2A illustrates a trailer configured as a pup trailer, in accordance with an embodiment of the present invention.
Figure 2B:
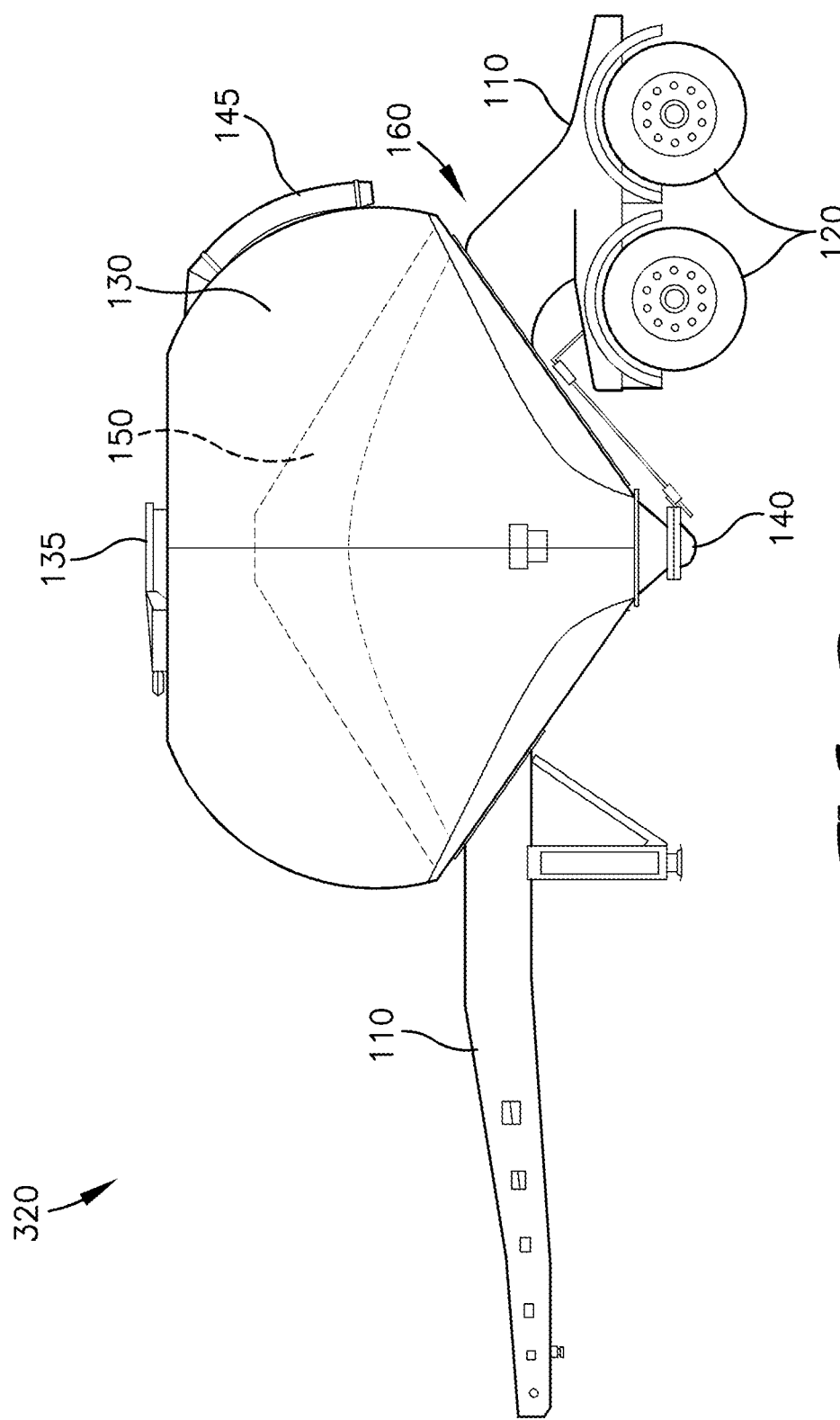
FIG. 2B illustrates another view of a pup trailer, in accordance with an embodiment of the present invention.

FIG. 2A illustrates a trailer 320 configured as a pup trailer, in accordance with an embodiment of the present invention. The pup trailer includes substantially the same components as the lead trailer 310, but with different relative locations to facilitate its operation and balancing behind the lead trailer. In particular, the vessel on the pup trailer is located further back than the vessel on the lead trailer. FIG. 2B illustrates another view of the pup trailer 320, in accordance with an embodiment of the present invention.

Figure 3:
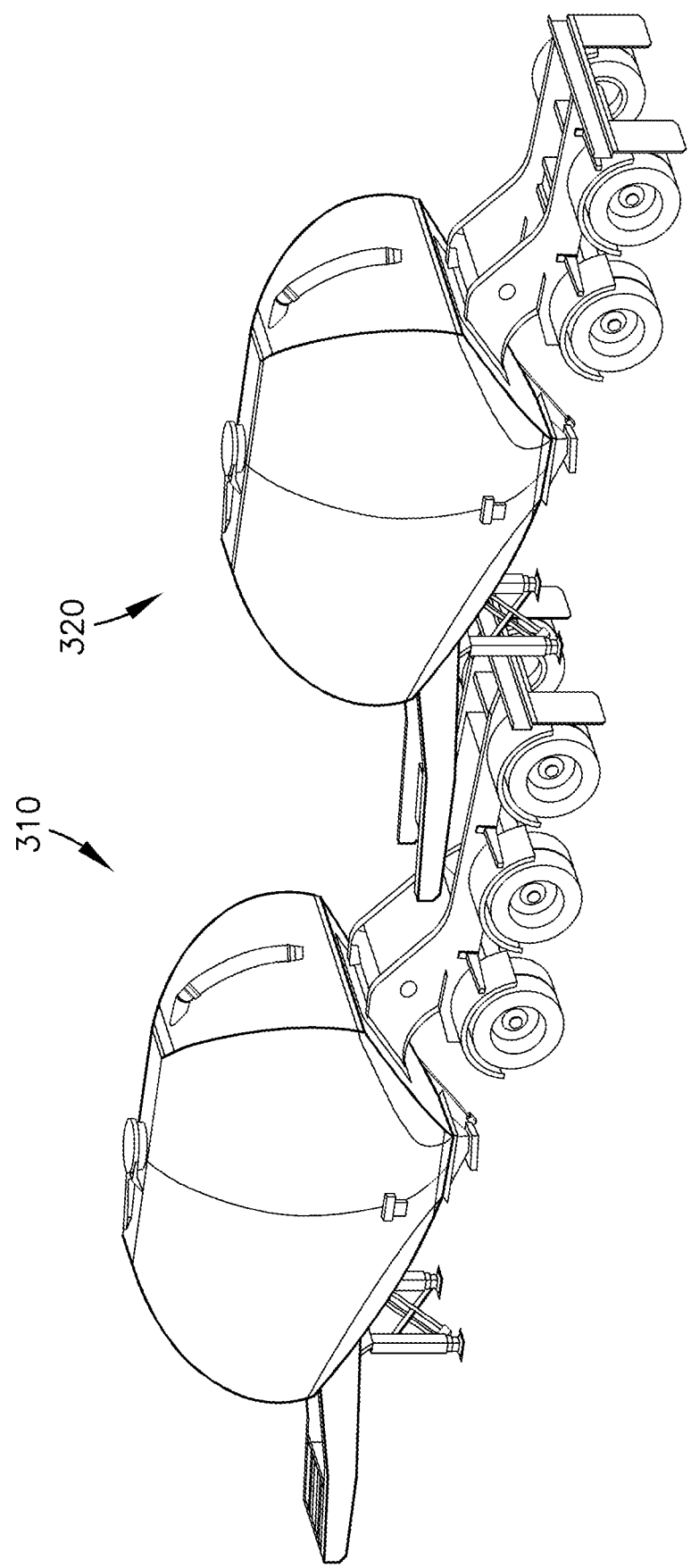
FIG. 3 illustrates a portion of a b-train comprising lead and pup trailers, in accordance with an embodiment of the present invention.

FIG. 3 illustrates a portion of a b-train comprising lead and pup trailers, in accordance with an embodiment of the present invention. The pup trailer 320 is attached to the hitch 115 of the lead trailer 310. The pup trailer 320 may use the hitch (not visible) mounted to the front portion of its chassis, for connection to the lead trailer 310. Likewise, the lead trailer 310 may have another trailer hitch (not visible) mounted to the front portion of its chassis for connection to a road tractor or other equipment.

Figure 4:
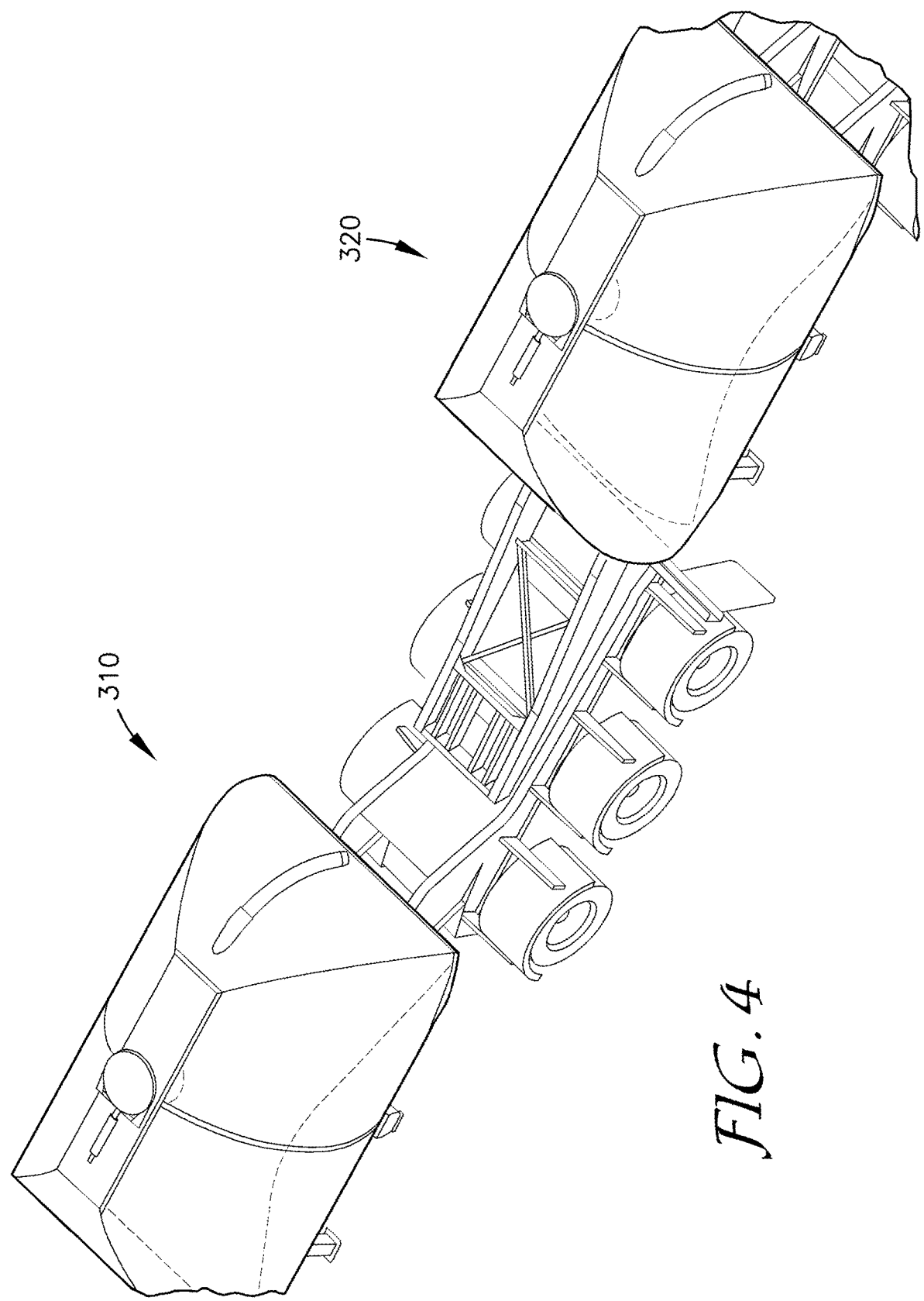
FIG. 4 illustrates an overhead view of a portion of FIG. 3, in accordance with an embodiment of the present invention.

FIG. 4 illustrates an overhead view of a portion of FIG. 3, in accordance with an embodiment of the present invention.

Figure 5:
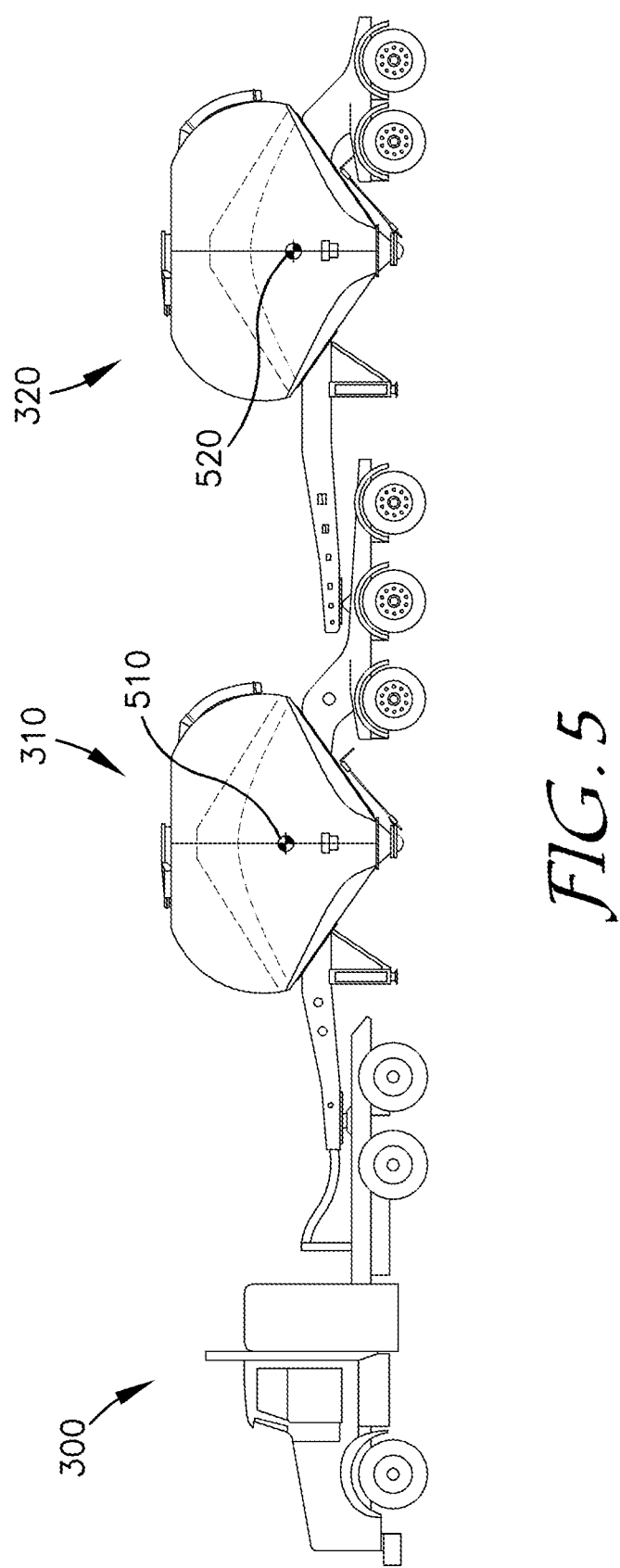
FIG. 5 illustrates another view of a b-train comprising a road tractor and lead (front) and pup (rear) trailers, in accordance with an embodiment of the present invention.

FIG. 5 illustrates another view of a b-train comprising a road tractor 300, a lead (front) trailer 310 and a pup (rear) trailer 320, in accordance with an embodiment of the present invention. While both the lead trailer 310 and the pup trailer 320 contain sand in their vessels, the lead trailer 310 may, in some embodiments, contain more sand than the pup trailer. The circles 510 and 520 represent the centers of gravity of each loaded trailers. Due to the different amount of sand loaded in the trailers, the heights of the sand naturally piled up in the two vessels are different. However as illustrated in FIG. 5, both of the two centers of gravity are close to or aligned with the top of the chassis (portion of chassis within the vessels not shown because of the sand inside the vessels) supporting the vessels. This means the centers of gravity may be vertically at or near the plane or region of passage of the chassis through the vessel. As such, torque exerted onto the chassis by the trailer load is mitigated.

It should be noted that a trailer according to the present invention can be towed as a single trailer or as part of a road train (e.g. b-train) comprising multiple trailers. At least one, and possibly multiple trailers in the road train can be trailers as described herein. The extendibility of the present invention often enables the road train to meet specific regional requirements. In some embodiments, a b-train comprises of two or more lead trailers 310. In such case, a pup trailer 320 may always be at the end of the b-train. In other words, all lead trailers 310 may be connected each other and placed between the road tractor 300 and the pup trailer 320.

Figure 6:
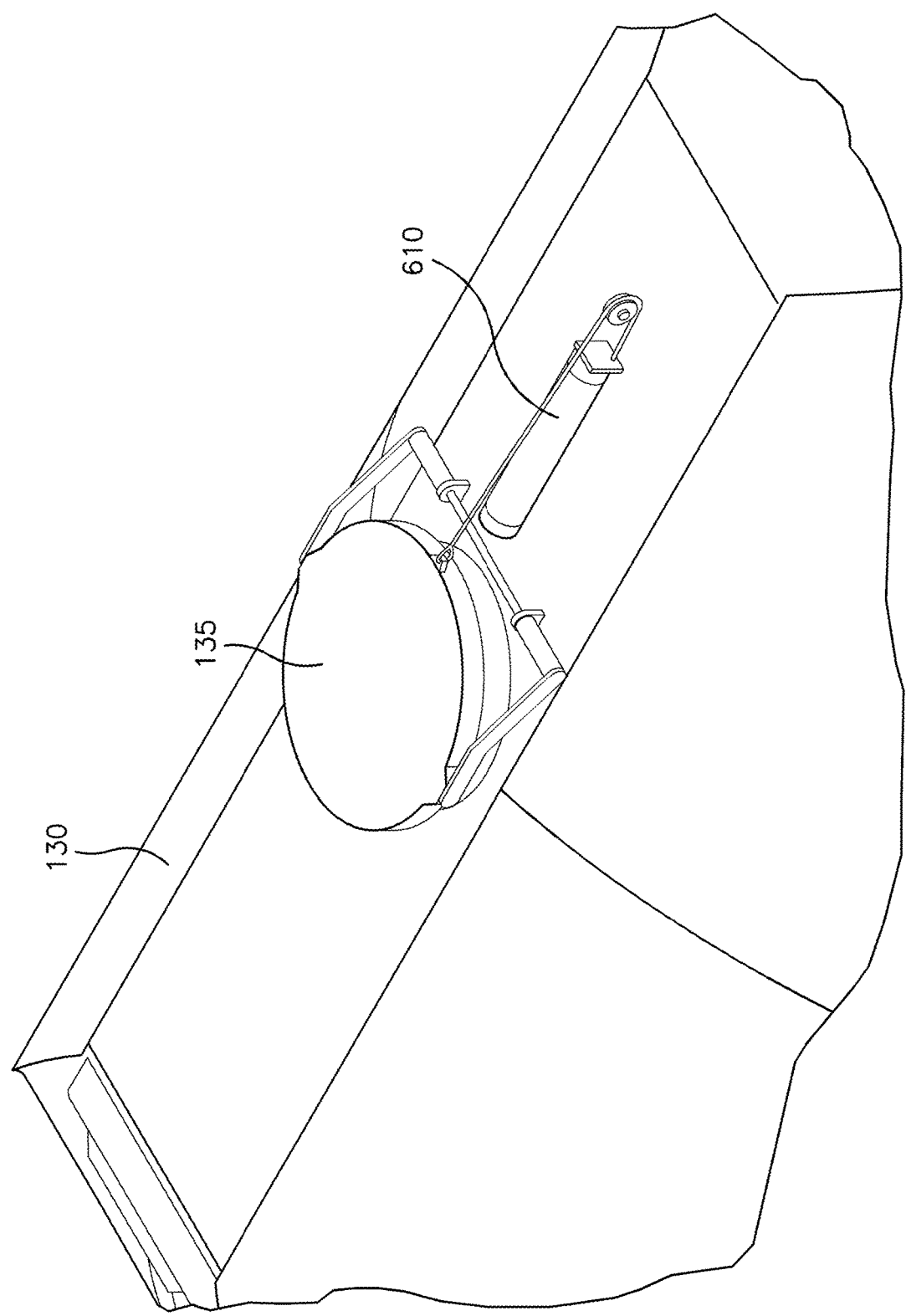
FIG. 6 illustrates a top loading hatch of a trailer, in accordance with an embodiment of the present invention.

FIG. 6 illustrates a top loading hatch 135 of a trailer, in accordance with an embodiment of the present invention. The top loading hatch can be opened to uncover an aperture leading into the interior of the vessel 130. Once opened, granular material can be poured into the vessel using other suitable equipment. In some embodiments, the top loading hatch 135 can be opened and closed manually. In some embodiments, the top loading hatch can be opened and closed automatically, i.e. using a non-manual source of mechanical power, such as an electric motor or pneumatic or hydraulic power pack. FIG. 6 illustrates an actuator and pulley system 610 which is operatively coupled to the hatch and usable for automatic opening and closing thereof. The pulley system 610 may be operative with or communicatively connected to a remote control panel so that opening and closing motion of the loading hatch 135 may be controlled at a remote distance.

Figure 7:
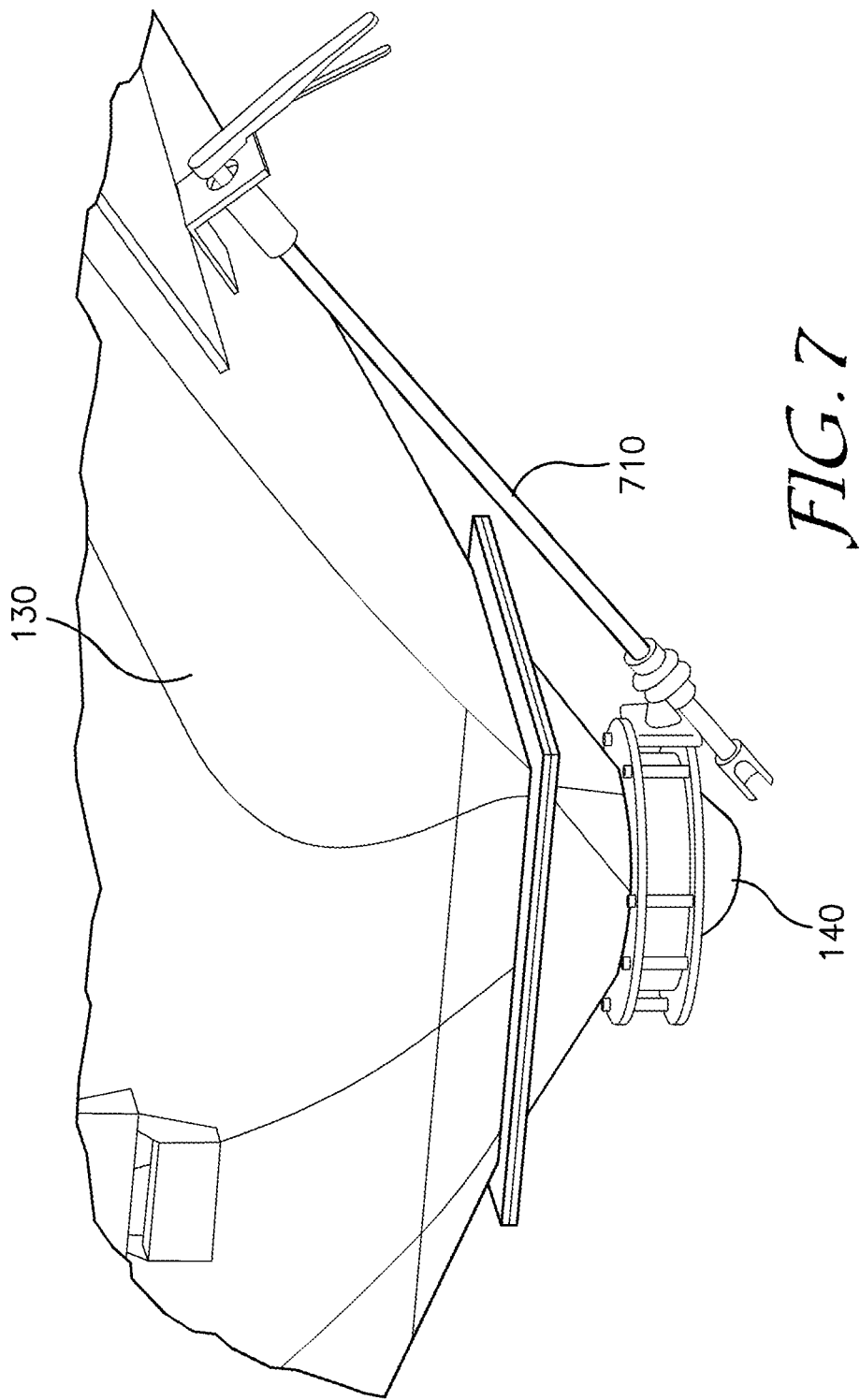
FIG. 7 illustrates a bottom unloading hatch (discharge gate) of the trailer, in accordance with an embodiment of the present invention.

FIG. 7 illustrates a bottom unloading hatch 140 (also referred to as a discharge gate) of the trailer, in accordance with an embodiment of the present invention. The bottom hatch can be opened to uncover an aperture leading out of the interior of the vessel 130. Once opened, granular material can be poured out the vessel under the assistance of gravity. In some embodiments, there is no assistance of air pressure or vibration for unloading. In this mode, the vessel acts similarly to a hopper. In some embodiments, the unloading hatch 140 can be opened and closed manually. In some embodiments, the bottom hatch can be opened and closed automatically. FIG. 7 illustrates an actuator system 710 which is operatively coupled to the hatch 140 and usable for opening and closing thereof. The actuator system 710 may be operative with or communicatively connected to a remote control panel so that opening and closing motion of the unloading hatch 140 may be controlled at a remote distance. The bottom unloading hatch 140 may have a variable and controllable sized aperture, so that the material flow rate can be varied.

In some embodiments, the bottom unloading hatch 140 includes a butterfly valve, which is operated using a manually operated actuator system 710. The actuator system 710 can include a handle and lever system which connects to the bottom unloading hatch via a moving shaft or cable, which actuates and controls the bottom unloading hatch. Other types of hatches or gates, such as sliding gates or hinged covers, can alternatively be employed.

Figure 8:
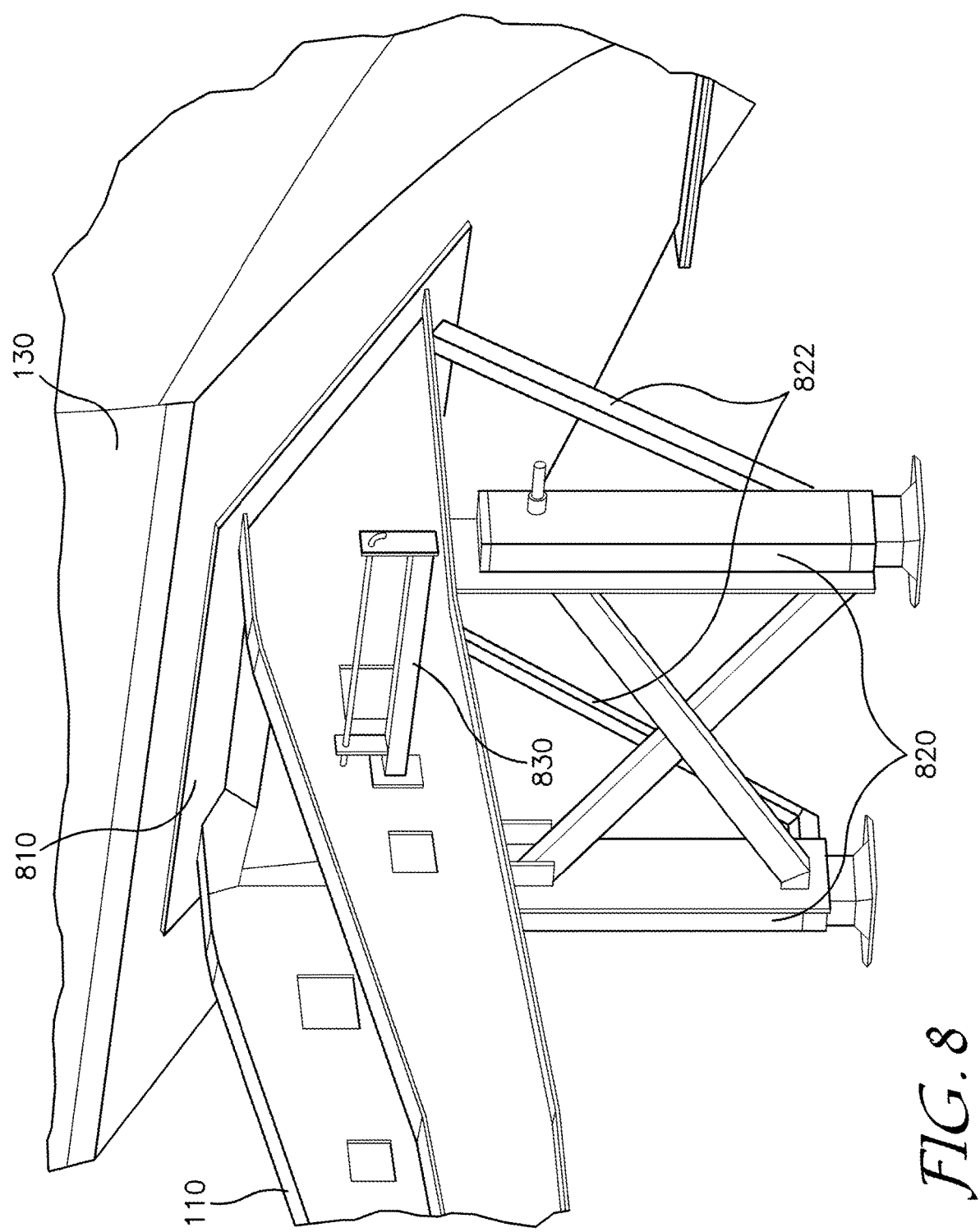
FIG. 8 illustrates a portion of a trailer forward of the vessel, in accordance with an embodiment of the present invention.

FIG. 8 illustrates a portion of the trailer in front of the vessel 130, in accordance with an embodiment of the present invention. The location of intrusion of (or in other embodiments, connection with) the chassis 110 into the vessel 130 is visible. A plate 810 is fitted around the chassis 110 and against the vessel sidewall (at the fore portion of the vessel) to assist in sealing the vessel sidewall at the location where, according to some embodiments, the chassis passes through the vessel sidewall. Similarly, another plate (not shown) may be affixed on the other side of the vessel 130 (i.e. aft of the vessel) to assist in sealing the vessel sidewall at the other location where the chassis passes through the vessel sidewall at that location. One or more ground supports 820 are attached to the chassis 110, with one or more auxiliary support arms 822 coupled between the ground supports 820 and the vessel 130. The ground supports 820 are adjustable in length. When a trailer does not need to move, the ground supports 820 of the trailer are extended so that the trailer can rigidly stand on the ground by itself even without the fore portion of the chassis 110 being mounted on a road tractor. On the other hand, when the trailer needs to move, the ground supports 820 are contracted so that the supports 820 is apart from the ground not to disturb movement of the trailer. A chain hangar 830 is also illustrated, which can be used to hang winter tire chains.

As mentioned above, a plate (e.g. 810) can be used to seal the vessel at the location(s) where the chassis extends through the vessel sidewall. An aperture is formed in the sidewall at this location to allow passage of the chassis. However, after the chassis is located passing through the vessel sidewall during assembly, it is desired to seal any remaining gaps in the vessel sidewall, at this location, that are large enough to allow escape of the granular material from the vessel. The plate is shaped to fit overtop of the aperture and also closely around the chassis, so as to cover gaps in the vessel sidewall. The plate may include multiple portions that are fitted together. Remaining gaps may be covered using filler material, such as solder, polymers flowed into place and cured, etc. Rivets or other fasteners may be used to hold the plate in place.

Figure 9:
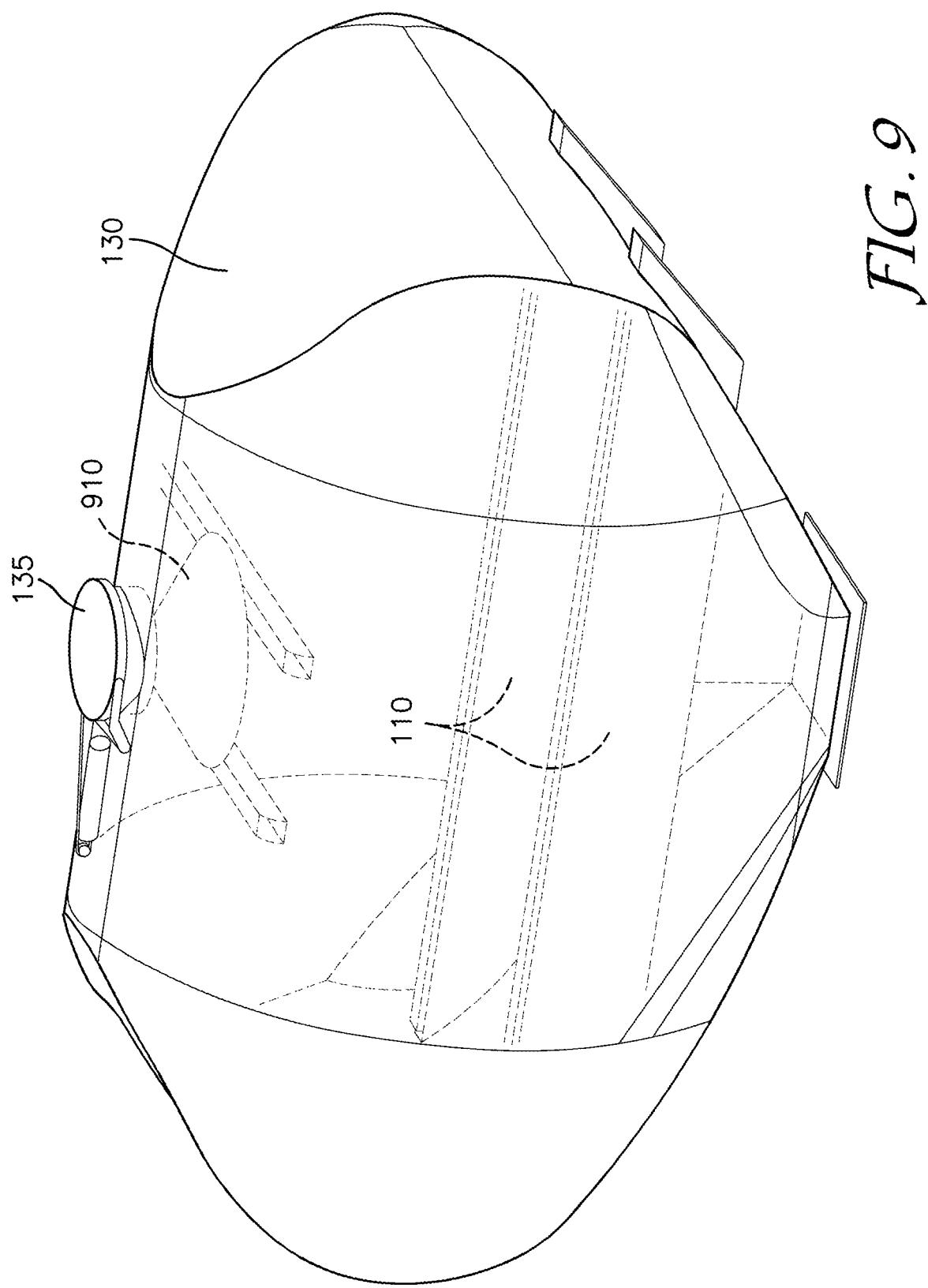
FIG. 9 illustrates a distributing device which distributes bulk material, flowing from the loading hatch, horizontally to different locations within the trailer vessel.

FIG. 9 illustrates an optional distributing device 910 which distributes bulk material, flowing downward from the loading hatch 135, horizontally to different locations within the trailer vessel. The distributing device is configured to horizontally redirect at least a portion of the bulk material as it flows downwards from the loading hatch. The material impacts the distributing device, whereupon the material is redirected due to the angle of the device. As illustrated, the distributing device has a sloped surface, such as a conical surface. The degree of the slope may be determined in consideration of the type of bulk material, such as grain size, density, grain shape, cohesion, etc. The distributing device may further include one or more apertures (not shown), such as a centre aperture. The apertures allow some of the bulk material to flow directly downward rather than being horizontally distributed outward. In other embodiments, the distributing device may have an irregular shape. The shape of the distributing device may be determined in consideration of the type of bulk material. The device may be conical or frustro-conical, for example. In some embodiments, the distributing device may be tilted or otherwise shaped to cause different amounts of bulk material to flow in different directions. In some embodiments, the distributing device can be located lower than illustrated, so that it is spaced apart from the loading hatch.

As such, in some embodiments, the trailer further comprises one or more distributing devices located within the vessel beneath the loading hatch, the distributing devices configured to receive and redirect the flow-able material, flowing downward from the loading hatch during loading, the redirection causing horizontal distribution of the flow-able material within the vessel.

FIG. 9 also illustrates a portion of the chassis 110 passing through the interior of the vessel 130, according to some embodiments. Notably, within the interior of the vessel, the two parallel side beams of the chassis are not connected by horizontal connectors, as these would inhibit bulk material flow. In some embodiments, a limited number of such horizontal connectors, such as narrow beams or bars, may be included within the vessel interior. In some embodiments, the two parallel side beams of the chassis and/or the horizontal connectors within the vessel interior are sloped to inhibit retention of bulk material thereon when the unloading hatch is open. In some embodiments, the two parallel side beams of the chassis and/or the horizontal connectors have one or more apertures (not shown), or otherwise define one or more gaps therebetween, to limit potential inhibition of bulk material flow due to the location of the chassis within the vessel. The apertures may help to reduce the weight of the vessel as well.

Figure 10A:
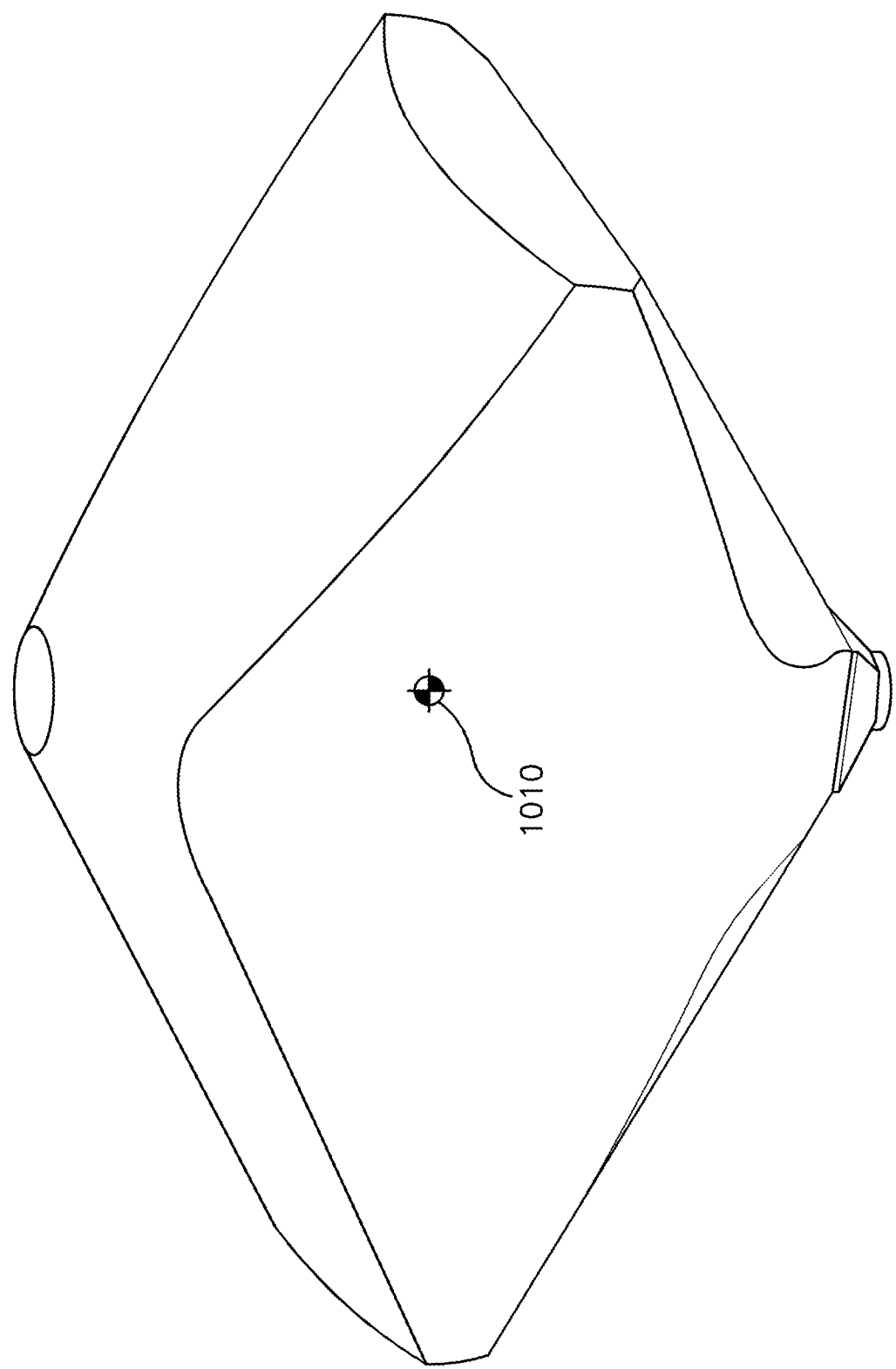
FIG. 10A and FIG. 10B illustrate the volume and shape of sand loaded in the trailer of FIG. 1, without showing the trailer, in accordance with an embodiment of the present invention.
Figure 10B:
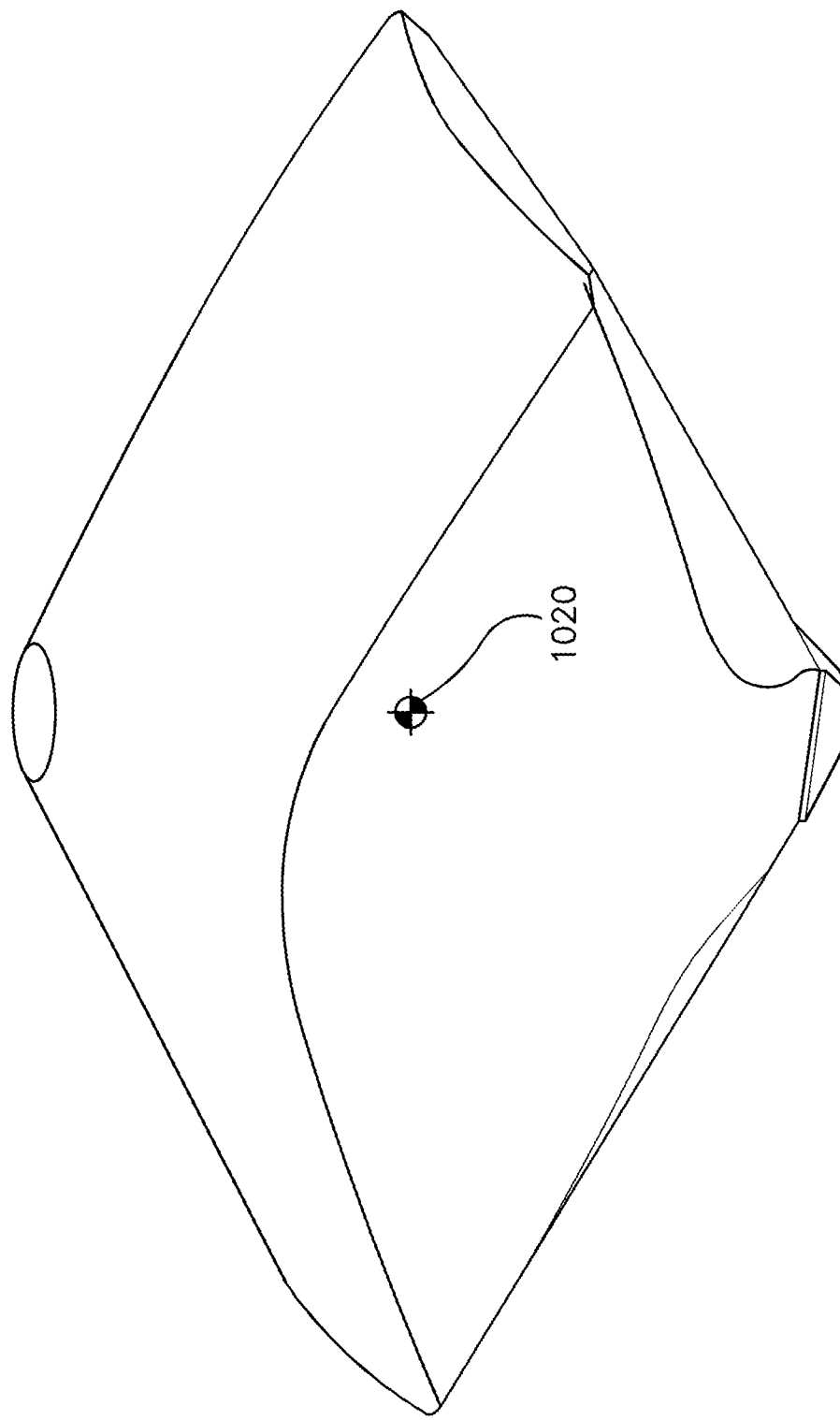

FIG. 10A and FIG. 10B illustrate the volume and shape of sand loaded in the lead trailer of FIG. 1, without showing the trailer itself. The shape of the upper portion of the sand file is due to the natural distribution (conical piling) of sand when poured into the vessel using gravity, without air pressure or vibration, in accordance with an embodiment of the present invention. FIG. 10A illustrates a maximal filling of the trailer, for example at about 69000 pounds of bulk material. FIG. 10A illustrates a lesser filling of the trailer, for example at about 55100 pounds of bulk material. The markers 1010 and 1020 represent the centers of gravity for each sand pile. As illustrated in the drawings, the centers of gravity are located alike at about the top of the chassis extending through the vessel (not shown). This means the centers of gravity may be always vertically at or near the region of passage of the chassis through the vessel. As such, torque exerted onto the chassis is mitigated.

Figure 11A:
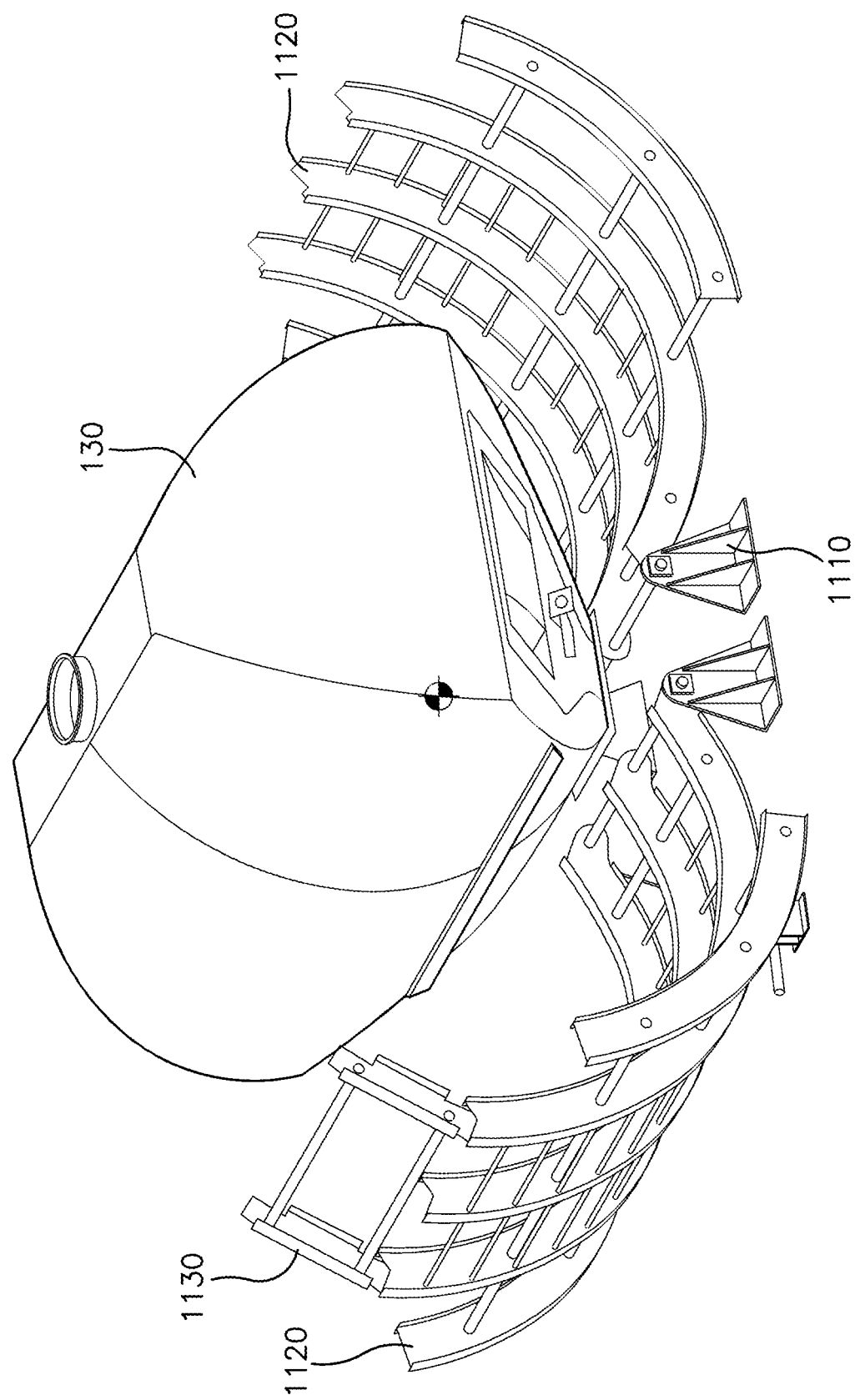
FIG. 11A and FIG. 11B illustrate a manufacturing jig for constructing a trailer vessel, in accordance with an embodiment of the present invention.
Figure 11B:
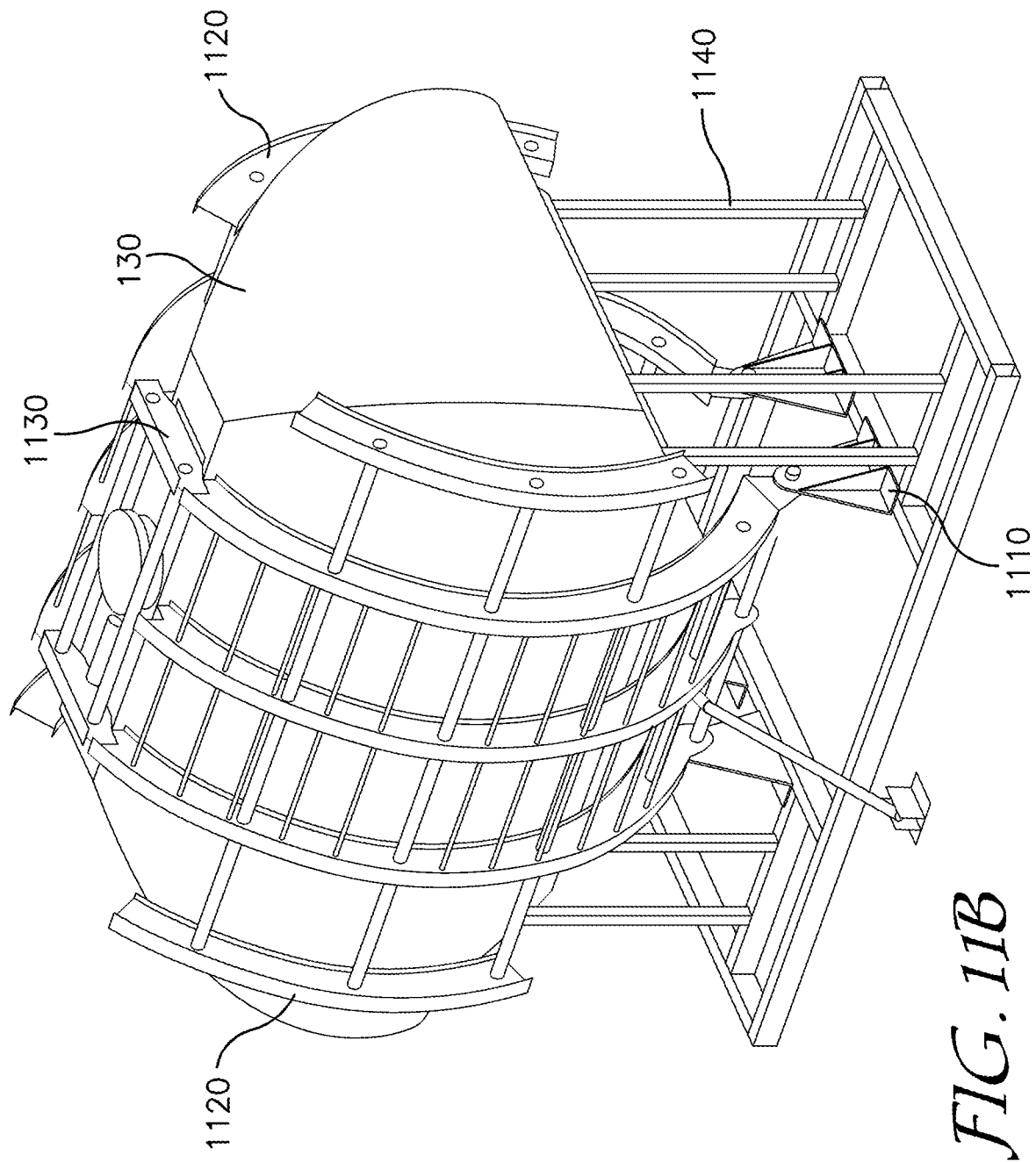

FIG. 11A and FIG. 11B illustrate a manufacturing jig for constructing a trailer vessel 130, in accordance with an embodiment of the present invention. The vessel 130 is shown in its finished form for clarity, although it will be readily understood that various pieces may be sequentially added and welded together during construction. The jig includes a base 1110, curved supports 1120 pivotably attached to and anchored by the base 1110, and a hinged top connection piece 1130 for retaining the curved supports in place around the vessel pieces. The top connection piece 1130 is hingedly attached to one of the supports 1120 and is removably attachable to the other one of the supports 1120 as shown in FIG. 11B. An additional support structure 1140 can also be put in place, for example before or after the curved supports are in place. The manufacturing jig acts as a temporary support frame for the vessel pieces for example during initial tack welding. FIG. 11A illustrates an open position for the jig, which enables insertion and removal of the vessel pieces. FIG. 11B illustrates a closed position for the jig, in which the jig engages and supports the vessel pieces. Manufacturing or repair of the vessel may therefore comprise using the above jig to support portions of the vessel during welding or other interconnection operations.

Figure 12:
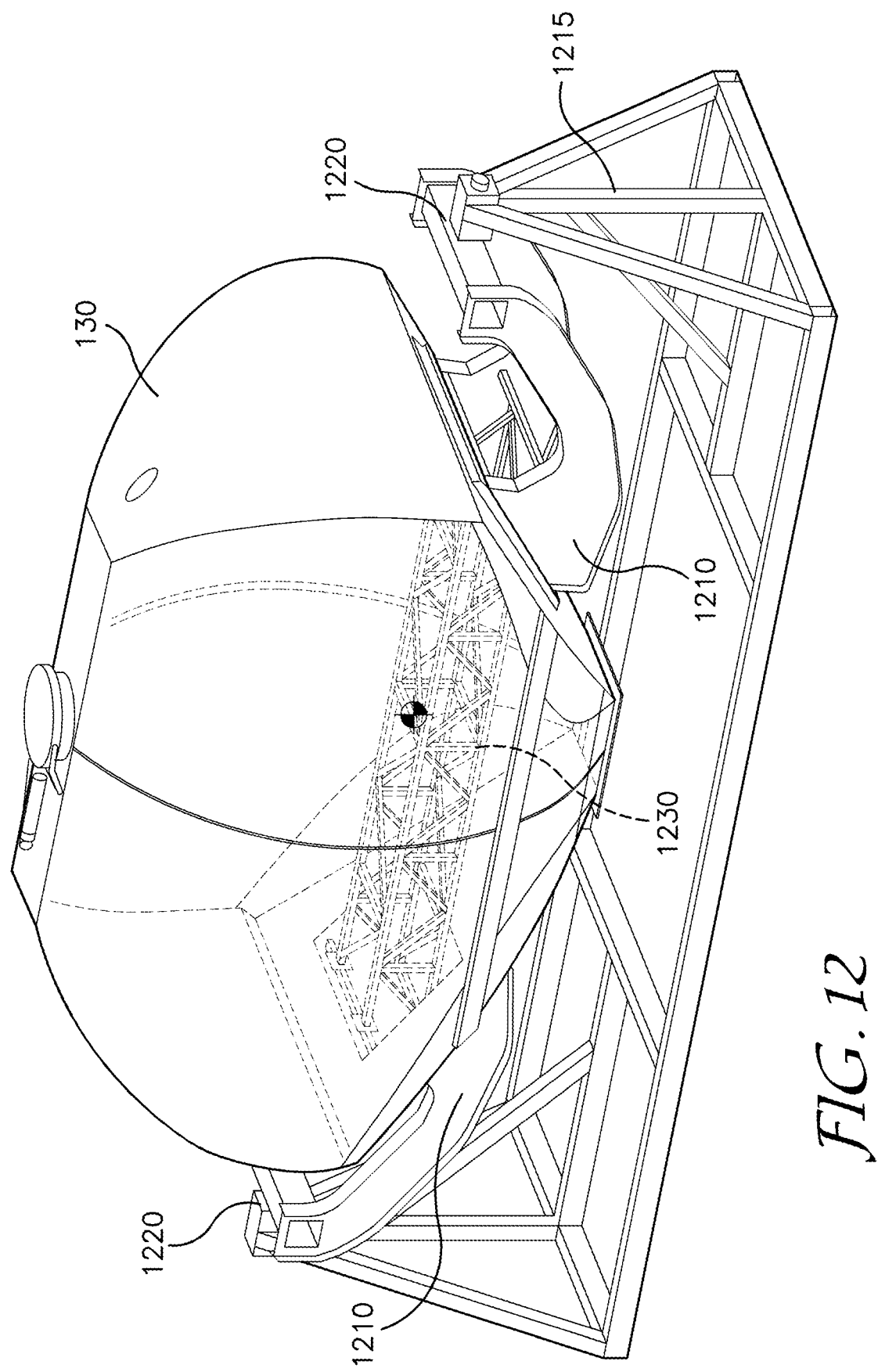
FIG. 12 illustrates a rotating manufacturing fixture for constructing a trailer vessel, in accordance with an embodiment of the present invention.

FIG. 12 illustrates a rotating manufacturing fixture 1200 for constructing a trailer vessel, in accordance with an embodiment of the present invention. The fixture 1200 supports the vessel 130 above ground. The fixture includes a cross member 1210 which passes through the vessel 130 in the same manner as the chassis horizontally extending portion. Therefore, the chassis-through-vessel design also facilitates use of the fixture 1200. The cross member 1210 is mounted at each end to a base 1215 using a rotatable connections 1220. The vessel can therefore be rotated by at least a predetermined amount, and possibly with up to 360 degrees of rotatability. This facilitates access to different parts of the vessel from a given position, so that different parts of the vessel can be worked on (e.g. welded) during construction or repair. In some embodiments, the beam 1230 extending through the vessel interior is part of the cross member 1210. In other embodiments, the beam 1230 is part of the trailer, for example one section of a multi-section chassis. Manufacturing or repair of the vessel may therefore comprise using the above fixture to support and rotate the vessel during welding or other interconnection or manufacturing operations.

Figure 13:
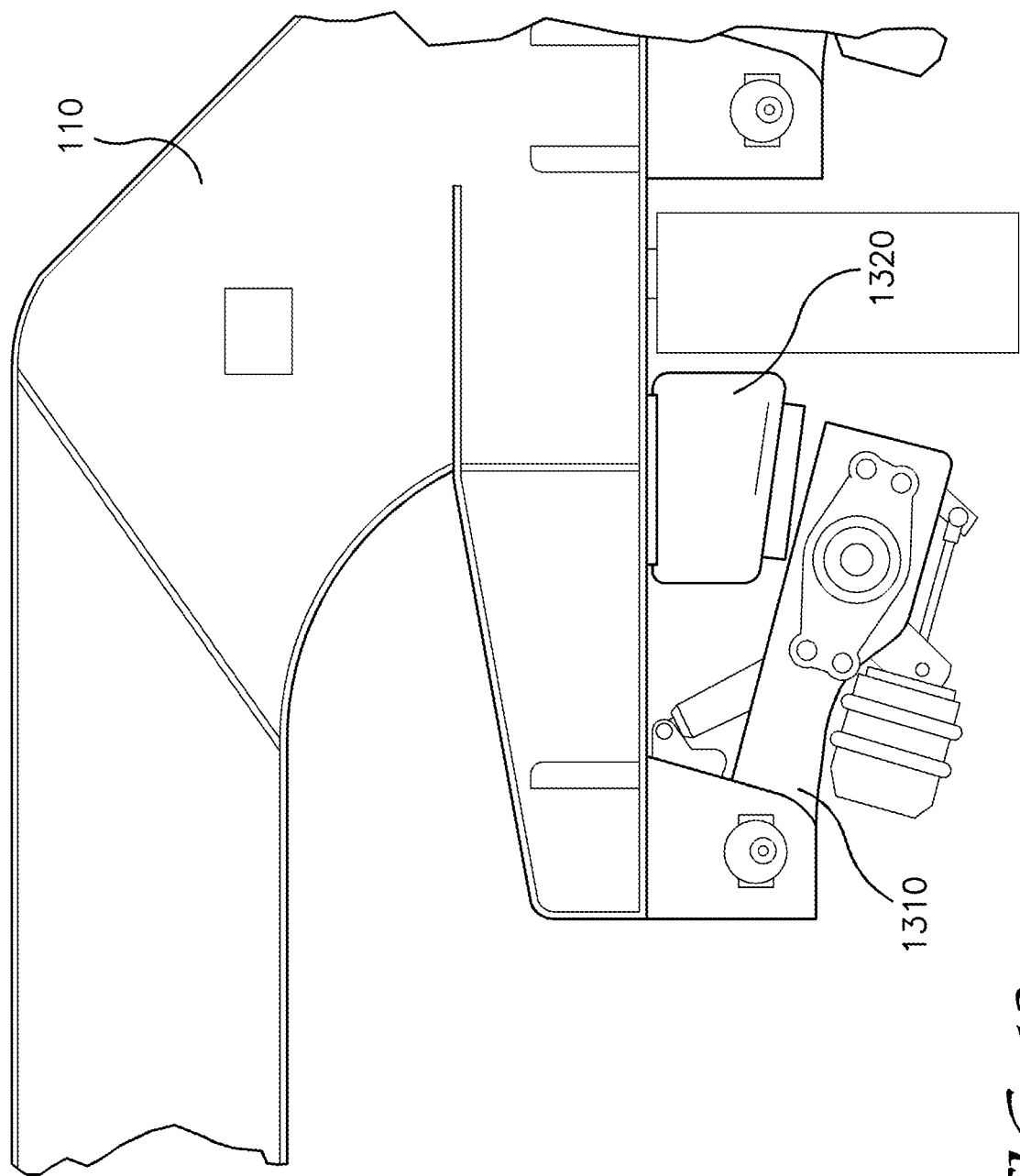
FIG. 13 illustrates a wheel axle connected to the trailer chassis in a cantilevered manner, in accordance with an embodiment of the present invention.

In some embodiments, one or more of the wheel axles are connected to the chassis using a cantilevered axle connection. Referring to FIG. 13, an axle arm 1310 is pivotably connected to the chassis 110 at a first end, and the wheel axle is mounted to the axle arm. Suspension components such as dampers, shock absorbers, and/or struts can be mounted between the chassis and the axle arm. The suspension system includes a deformable element 1320 against which the axle arm 1310 rests at a second end of the axle arm which is opposite to the first end.

Potential advantages of some embodiments of the present invention include; the ability to haul up to maximum allowable volumes of bulk material; high-speed loading and unloading; and mitigation of silica dust around the trailer, due to a mostly sealed design and an appropriately positioned vent.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A trailer for transporting flow-able material, comprising:
   a chassis having a horizontally extending portion;
   at least two wheels or wheel alternatives mounted to the chassis; and
   a hollow enclosed vessel for holding the flow-able material, the vessel mounted to the horizontally extending portion, wherein the horizontally extending portion extends through the vessel and through a first aperture in a front wall and a second aperture in a rear wall with the flow-able material in contact with and surrounding the horizontally extending portion dampening oscillations of the horizontally extending portion, a first and second plate disposed respectively over the first and second apertures, the first and second plates surrounding the horizontally extending portion to seal respectively the first and second apertures as well as a loading hatch located at or near a top of the vessel and an unloading hatch located at or near a bottom of the vessel.

2. The trailer according to claim 1, wherein the horizontally extending portion contacts and supports the vessel at a substantially vertically centralized location of the vessel.

3. The trailer according to claim 1, wherein the horizontally extending portion extends through the vessel.

4. The trailer according to claim 3, wherein the horizontally extending portion is formed of one or more resilient materials and configured to operate as a suspension system for the trailer.

5. The trailer according to claim 3, wherein the horizontally extending portion extends fore and aft of the vessel.

6. The trailer according to claim 3, wherein sidewalls of the vessel are spaced apart from the horizontally extending portion extending through the vessel, thereby defining a region for the material within the vessel and horizontally outward from the horizontally extending portion.

7. The trailer according to claim 3, wherein the horizontally extending portion comprises a first beam and a second beam extending through the vessel in a fore-to-aft direction, and wherein one or more gaps for the material are located between the first beam and the second beam.

8. The trailer according to claim 1, wherein the chassis comprises plural sections connected together in a longitudinal direction of the trailer.

9. The trailer according to claim 8, wherein the plural sections comprise a first section disposed partially or fully within the vessel, and one or both of: a second section extending forward of the vessel and a third section extending rearward of the vessel.

10. The trailer according to claim 1, wherein the flow-able material is a granular material for hydraulic fracturing operations.

11. The trailer according to claim 10, wherein a lower portion of the vessel is tapered downward toward the unloading hatch and the lower portion has an interior surface sloped at an angle equal to or greater than an angle of repose of the flow-able material.

12. The trailer according to claim 1, wherein the vessel is configured for loading of the flow-able material through the loading hatch using gravity, and for unloading of the flow-able material through the unloading hatch using gravity.

13. The trailer according to claim 1, wherein the loading hatch and the unloading hatch are aligned along a common vertical axis.

14. The trailer according to claim 1, wherein an upper portion of the flow-able material is disposed in a cone shape within the vessel upon loading to a predetermined full level, and wherein an upper portion of the vessel comprises sidewalls which are positioned to be proximate to, but spaced apart from, the cone shape upon said loading to the predetermined fill level.

15. The trailer according to claim 1, wherein upon loading the vessel to a predetermined full level, a lower portion of the flow-able material rests against a first portion of interior sidewalls of the vessel, and wherein a second portion of interior sidewalls of the vessel above the first portion are tapered toward the loading hatch.

16. The trailer according to claim 1, wherein one or more interior corners of the vessel are filleted or chamfered.

17. The trailer according to claim 1, wherein the chassis and the vessel are manufactured of different materials.

18. The trailer according to claim 1, further comprising one or more vents at or near a top of the vessel to ventilate air inside of the vessel.

19. The trailer according to claim 18, wherein at least one of the one or more vents comprises an elongated air channel, the air channel extending horizontally from an interior of the vessel to an exterior of the vessel, with an outer end of the air channel facing downward.

20. The trailer according to claim 3, wherein the vessel is movably mounted to the horizontally extending portion.

21. The trailer according to claim 1, further comprising marrying plates interposed between the chassis and the vessel.

22. The trailer according to claim 1, wherein the vessel is configured to cause the flow-able material to flow out of the unloading hatch according to a funnel flow mode.

23. The trailer according to claim 1, wherein the loading hatch is a single unique loading hatch on the vessel, the unloading hatch is a single unique unloading hatch on the vessel, or both, and wherein the vessel is shaped to facilitate trailer balance during and after loading and unloading through the loading hatch and the unloading hatch, respectively.

24. A method for manufacturing a trailer for transporting flow-able material, the trailer comprising:
a chassis having a horizontally extending portion;
at least two wheels or wheel alternatives mounted to the chassis; and
a hollow enclosed vessel for holding the flow-able material, the vessel mounted to the horizontally extending portion, wherein the horizontally extending portion spans through the vessel and through a first aperture in a front wall and a second aperture in a rear wall with the flow-able material in contact with and surrounding the horizontally extending portion dampening oscillations of the horizontally extending portion, a first and second plate disposed respectively over the first and second apertures, the first and second plates surrounding the horizontally extending portion to seal respectively the first and second apertures, the vessel further comprising a loading hatch located at or near a top of the vessel and an unloading hatch located at or near a bottom of the vessel;
the method comprising:
separately constructing the chassis and the vessel;
affixing the vessel to the chassis at a desired location.

* * * * *